(12) United States Patent
Ramakrishnan Nair

(10) Patent No.: US 10,977,061 B2
(45) Date of Patent: *Apr. 13, 2021

(54) DYNAMIC DEVICE VIRTUALIZATION FOR USE BY GUEST USER PROCESSES BASED ON OBSERVED BEHAVIORS OF NATIVE DEVICE DRIVERS

(71) Applicant: Dynavisor, Inc., San Jose, CA (US)

(72) Inventor: Sreekumar Ramakrishnan Nair, San Jose, CA (US)

(73) Assignee: Dynavisor, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/133,443

(22) Filed: Dec. 18, 2013

(65) Prior Publication Data

US 2014/0173600 A1 Jun. 19, 2014

Related U.S. Application Data

(60) Provisional application No. 61/739,002, filed on Dec. 18, 2012.

(51) Int. Cl.
*G06F 9/455* (2018.01)
*G06F 9/46* (2006.01)

(52) U.S. Cl.
CPC ........ *G06F 9/45533* (2013.01); *G06F 9/4555* (2013.01); *G06F 9/461* (2013.01)

(58) Field of Classification Search
CPC .................................................. G06F 9/45533
See application file for complete search history.

(56) References Cited

U.S. PATENT DOCUMENTS

| | | | |
|---|---|---|---|
| 5,675,762 A | * | 10/1997 | Bodin ................ G06F 12/1081 |
| | | | 711/206 |
| 5,732,282 A | | 3/1998 | Provino et al. |
| 6,047,323 A | | 4/2000 | Krause |
| 7,500,071 B2 | | 3/2009 | Boyd et al. |
| 7,921,262 B1 | | 4/2011 | Dash et al. |
| 8,429,649 B1 | | 4/2013 | Feathergill et al. |
| 8,510,756 B1 | | 8/2013 | Koryakin et al. |
| 8,527,673 B2 | | 9/2013 | Mahalingam et al. |

(Continued)

OTHER PUBLICATIONS

VMWARE, Inc., "Understanding Full Virtualization, Paravirtualization and Hardware Assist", white paper, Sep. 11, 2007.

(Continued)

*Primary Examiner* — Jorge A Chu Joy-Davila
(74) *Attorney, Agent, or Firm* — Goodwin Procter LLP

(57) ABSTRACT

A system and method for providing dynamic device virtualization is herein disclosed. According to one embodiment, the computer-implemented method includes providing a hypervisor and one or more guest virtual machines (VMs). Each guest VM is disposed to run a guest user process and the hypervisor is split into a device hypervisor and a compute hypervisor. The computer-implemented method further includes providing an interface between the device hypervisor and the compute hypervisor. The compute hypervisor manages an efficient use of CPU and memory of a host and the device hypervisor manages a device connected to the host by exploiting hardware acceleration of the device.

19 Claims, 19 Drawing Sheets

(56) References Cited

U.S. PATENT DOCUMENTS

| | | | |
|---|---|---|---|
| 8,881,140 B1* | 11/2014 | Bringhurst | G06F 9/4411 709/221 |
| 9,112,911 B1 | 8/2015 | Karhade | |
| 2001/0005465 A1 | 6/2001 | Matsui et al. | |
| 2004/0205755 A1* | 10/2004 | Lescouet | G06F 9/4843 718/100 |
| 2004/0221290 A1 | 11/2004 | Casey et al. | |
| 2005/0235123 A1 | 10/2005 | Zimmer et al. | |
| 2006/0010314 A1 | 1/2006 | Xu | |
| 2006/0064549 A1 | 3/2006 | Wintergerst | |
| 2006/0130060 A1* | 6/2006 | Anderson | G06F 9/45533 718/1 |
| 2007/0028244 A1 | 2/2007 | Landis et al. | |
| 2007/0050764 A1* | 3/2007 | Traut | G06F 9/45558 718/1 |
| 2007/0050770 A1* | 3/2007 | Geisinger | G06F 9/45537 718/100 |
| 2007/0061441 A1 | 3/2007 | Landis et al. | |
| 2007/0294480 A1 | 12/2007 | Moser | |
| 2008/0059556 A1 | 3/2008 | Greenspan et al. | |
| 2008/0127348 A1* | 5/2008 | Largman | G06F 21/56 726/24 |
| 2008/0244538 A1 | 10/2008 | Nair, Sr. et al. | |
| 2008/0250222 A1 | 10/2008 | Gokhale et al. | |
| 2009/0044274 A1 | 2/2009 | Budko et al. | |
| 2009/0055693 A1 | 2/2009 | Budko et al. | |
| 2009/0189894 A1 | 7/2009 | Petrov et al. | |
| 2009/0276773 A1 | 11/2009 | Brown et al. | |
| 2009/0313391 A1 | 12/2009 | Watanabe | |
| 2010/0005464 A1 | 1/2010 | Malyugin et al. | |
| 2010/0180274 A1 | 7/2010 | Cherian et al. | |
| 2010/0235381 A1 | 9/2010 | Sukanen et al. | |
| 2010/0235831 A1 | 9/2010 | Dittmer | |
| 2010/0333088 A1* | 12/2010 | Rogel | G06F 9/45533 718/1 |
| 2011/0018883 A1* | 1/2011 | Sampath | G06F 9/4445 345/522 |
| 2011/0154318 A1* | 6/2011 | Oshins | G06F 9/45537 718/1 |
| 2011/0167422 A1 | 7/2011 | Eom et al. | |
| 2011/0239213 A1 | 9/2011 | Aswani et al. | |
| 2012/0002535 A1 | 1/2012 | Droux et al. | |
| 2012/0017029 A1 | 1/2012 | Santos et al. | |
| 2012/0084517 A1 | 4/2012 | Post et al. | |
| 2012/0102491 A1* | 4/2012 | Maharana | G06F 9/45558 718/1 |
| 2012/0167082 A1* | 6/2012 | Kumar | G06F 9/4555 718/1 |
| 2012/0167085 A1 | 6/2012 | Subramaniyan et al. | |
| 2012/0216188 A1* | 8/2012 | Tsirkin | G06F 9/45558 718/1 |
| 2012/0266165 A1 | 10/2012 | Cen et al. | |
| 2012/0272015 A1* | 10/2012 | Fahrig | G06F 9/45533 711/153 |
| 2012/0278803 A1* | 11/2012 | Pavlov | G06F 9/45558 718/1 |
| 2012/0284712 A1* | 11/2012 | Nimmagadda | G06F 9/5077 718/1 |
| 2013/0072260 A1 | 3/2013 | Nair et al. | |
| 2013/0204924 A1 | 8/2013 | Nair et al. | |
| 2013/0282994 A1 | 10/2013 | Wires et al. | |
| 2014/0149985 A1 | 5/2014 | Takeuchi et al. | |
| 2014/0173600 A1 | 6/2014 | Ramakrishnan | |
| 2014/0282514 A1 | 9/2014 | Carson et al. | |
| 2014/0331223 A1 | 11/2014 | Lee et al. | |
| 2015/0012606 A1 | 1/2015 | Gadipudi | |
| 2015/0058838 A1 | 2/2015 | Tsirkin et al. | |

OTHER PUBLICATIONS

International Search Report dated Apr. 30, 2014 in corresponding PCT Application No. PCT/US2013/076294 filed Dec. 18, 2013, inventor Ramakrishnan Nair, Sreekumar.

International Search Report dated Apr. 30, 2014 in corresponding PCT Application No. PCT/US2013/076283 filed Dec. 18, 2013, inventor Ramakrishnan Nair, Sreekumar.

International Search Report dated Mar. 28, 2014 in corresponding PCT Application No. PCT/US2013/076290 filed Dec. 18, 2013, inventor Ramakrishnan Nair, Sreekumar.

Gupta, Diwaker et al., "Xenmon: Qos monitoring and performance profiling tool." Hewlett Packard Labs, Tech. Rep. HPL-2005-187 (2005). pp. 1-13.

Himanshu, Raj et al., "High Performances and Scalable I/O virtualization via self-virtualized devices." Proceedings of the 16th International symposium on High Performance Distributed Computing. ACM, 2007, pp. 179-188.

International Search Report dated Jun. 9, 2015 in corresponding PCT Application No. PCT/US2015/017592 filed Feb. 25, 2015, inventor Nair, Sreekumar.

King, Samuel et al., Operating System Support for Virtual Machines. USENIX Annual Technical Conference, General Track 2003. pp. 1-14.

Sani, Ardalan et al., A Technical Report Entitled: Making I/O Virtualization Easy with Device Files, Technical Report Apr. 13, 2013, Rice University.

Scott's Weblog (referencing) Xu, Howie et al., TA2644: Networking I/O Virtualization, VMworld 2008.

* cited by examiner

```
topen(args) {
    ExecuteOnHost(DOPEN,
args);
} tread(args) {
    ExecuteOnHost(DREAD,
args);
} twrite(args) {
    ExecuteOnHost(DWRITE,
args);
}
...
static int __init tinit(void) { ... }
static int __exit texit(void) { ... } module_init(tinit);
       module_exit(texit);
```

DRM GPU Virtual Driver
1101

```
ExecuteOnHost(func, args) {

SwitchToHybridAddressSpace();
    // Directly call entry points in
    // Native Device Driver:
    drm_fops[func](args);

SwitchToNormalAddressSpace()
;
}

ExecuteOnGuest(func, args) {

SwitchToGuestAddressSpace();
    InvokeCallBack(func, args);

SwitchToHostAddressSpace();
}
```

Trap Door Page
1102

Figure 11

DYNAMIC DEVICE VIRTUALIZATION FOR USE BY GUEST USER PROCESSES BASED ON OBSERVED BEHAVIORS OF NATIVE DEVICE DRIVERS

The present application claims the benefit of and priority to U.S. Provisional Patent Application Ser. No. 61/739,002 filed on Dec. 18, 2012, which is hereby incorporated by reference.

FIELD

The present disclosure relates in general to the field of computer software and systems, and in particular, to a system and method for dynamic device virtualization.

BACKGROUND

In a computer system, the term virtualization means hiding an implementation of components or abstracting details. In a rudimentary computing environment of a single tasking, one single program (or task) controls the entire computer system.

With the advent of multi-tasking computers, an operating system (OS) facilitated the efficient sharing of hardware devices across multiple tasks. An OS primarily provides functionalities for process management, memory management, and device management. For process management, an OS runs one task at a time on a central processing unit (CPU) for a predetermined quantum of time until the task is preempted by the OS to relinquish the CPU time for another task at the end of the predetermined time. For memory management, regardless of the size of the physical memory available on the computer system, the OS allows each task to have the full addressable range of memory, so that each task can address the entire address space. The mapping of physical addresses to virtual addresses of a given task is controlled by a kernel of the OS through a mechanism referred to as demand paging. During the execution of a task, all references to the code and data locations are given with respect to their virtual addresses. In early computer architectures, the translation of virtual address to physical address was performed in software, therefore the translation was painstakingly slow.

To overcome the performance limitation of software virtual address translation, processors (e.g., INTEL® i386) started to use hardware page tables to transparently perform the translation between virtual addresses and physical addresses. To facilitate faster context switching between the user process and the OS kernel via system calls, many OS'es like Linux started to map the kernel virtual address space into the address space of the task itself. For instance, in 32-bit Linux, three-fourths of memory (0x00000000 through 0xbfffffff) is assigned for the user address space and one-fourth of memory (0xc0000000 through 0xffffffff) is assigned for the kernel address space.

The OS permits that each task has an exclusive control over CPU and memory during the time slice of its execution. But for other devices such as graphics processing unit (GPU), storage devices, network interface card (NIC), the OS directly manages these devices and exercises discretion to ensure the appropriate use of these devices. For example, some devices may need to be exclusively used by one task (e.g., a printer), while others may be concurrently shared among multiple tasks. Some device operations need to be performed atomically while others may be interleaved.

S/360 system by IBM® launched in 1964 was the first attempt of system virtualization of the physical computer. System virtualization makes multiple instances of guest OS'es to run on the same hardware by a supervisory software layer called a hypervisor or a virtual machine manager (VMM). The hypervisor or VMM is interchangeably referred to as a host. Original system virtualization ran the OS in a de-privileged mode (i.e., non-supervisor mode). Based on their mode of deployment, hypervisors are classified into two types. Type 1 hypervisor boots directly on the bare metal (like a classical OS) and brings up the guest OS'es on top of the hypervisor layer. Examples of type 1 hypervisor include, but are not limited to, VMWARE® ESX hypervisor and XEN® hypervisor. Type 2 hypervisor, also referred to as a hosted hypervisor, runs inside a host OS that boots on the bare metal but the actual hypervisor is a user-mode component. Examples of type 2 hypervisor include, but are not limited to, VMX of VMWARE® Desktop, and QEMU of Kernel Virtual Machine (KVM).

During the early days of system virtualization, compute virtualization, i.e., virtualization of CPU and memory, posed technical challenges. For CPU virtualization of INTEL®/AMD® x86, when an OS runs in a de-privileged level, some sensitive instructions behave differently in the lower privilege levels without faulting. If the instruction had faulted (as happens in "trap-and-emulate" processor architectures), the hypervisor or host would get the opportunity to control and fix the anomaly. For example, if the OS runs in a lower privilege (e.g., Ring 1) than the designated privilege level (e.g., Ring 0), the processor simply executes these sensitive x86 instructions in Ring 1 with different semantics instead of faulting. Dynamic translation and OS paravirtualization techniques were devised to deal with sensitive instructions. Later processor manufacturers (e.g., INTEL®, AMD®) came up with efficient hardware architectures to handle CPU virtualization, for example, INTEL® virtual technology (VT) and AMD-V.

For memory virtualization, a guest virtual address that is translated to a guest physical address requires an additional level of translation to access physical memory destination of the host. Efficient hardware architectures such as INTEL® extended page table (EPT) and AMD®'s nested page table (NPT) address memory virtualization by providing hardware support for translating guest virtual address to host physical address.

After the compute virtualization was harnessed with efficient hardware architecture, the focus of the computing industry shifted to I/O virtualization. I/O virtualization involves virtualization of devices such as GPUs, storage devices, and NICs. Depending on the deployment type for system virtualization, there are three tiers of I/O virtualizations.

Tier 1 I/O virtualization is connectivity virtualization. Tier 1 I/O virtualization focuses on the optimization of the data center floor to improve the efficiency of physical connectivity, cabling, routing/switching, power distribution etc. For example, XSIGO® data center fabric minimizes physical connections across servers and provides a high speed and low-latency interconnect among servers.

Tier 2 I/O virtualization is hardware device virtualization. Tier 2 I/O virtualization focuses on making multiple virtual hardware endpoints available for use across multiple physical servers. Peripheral Component Interconnect Special Interest Group (PCI-SIG) defines standards for single root I/O virtualization (SR-IOV) and multi root I/O virtualization (MR-IOV). Both SR-IOV and MR-IOV aim at making single physical devices such as a GPU or NIC behave as if they are composed of multiple logical devices. Each of the multiple logical devices of a physical device, referred to as virtual functions (VFs), appears to OS'es as a virtual device such as an individual GPU or NIC. Each VF is exclusively assigned to a guest OS. Tier 2 I/O virtualization also involves PCI Express (PCIe) virtualization, for example, VirtenSys and Aprius. VirtenSys extends PCIe bus outside a group of servers to a switch from which PCIe-connected peripherals such as Ethernet NICs and fiber channel HBAs are shared by the servers, avoiding each of them requiring their own NIC and HBA. Aprius allows servers to share peripheral devices at PCIe bus speeds over a virtual PCIe bus network.

Tier 3 I/O virtualization is software device virtualization that runs inside the server boxes based on hypervisors or VMMs. Tier 3 I/O virtualization focuses on enhancing the overall scalability and utilization of devices like GPUs, storage devices and NICs. Tier 3 I/O virtualization enables concurrent use of I/O devices by multiple guest OS'es. Initially, tier 3 I/O virtualization used to emulate hardware devices in software. A virtual device driver that is loaded into a guest OS emulates device operations in software by communicating with a software layer in the host (e.g., a hypervisor). The virtual device driver cooperates with the native device drivers of the host to perform the I/O operations. Software device virtualization is generally slow because virtual device drivers are not designed to exploit device-specific optimization (e.g., hardware acceleration). However, software emulation provides good platform coverage because no specific knowledge of the hardware device is required.

The next advancement in tier 3 I/O virtualization was device paravirtualization. Device paravirtualization employs a split-driver architecture by providing a front-end driver in the guest OS and a back-end driver in the hypervisor or host. The back-end driver, also referred to as a VMM driver interface, works with the native device driver of the host or hypervisor. Paravirtualized drivers can be generic (e.g., class drivers such as network, block drivers) or device-specific. When paravirtualized drivers have device-specific intelligence, they permit guest OS'es to exploit hardware acceleration available in the actual hardware device. Thus, paravirtualization enables concurrent access to a hardware device yet providing close to native performance. To achieve best performance, device-specific paravirtualization requires each device manufacturer to write paravirtualized split-drivers for each device/OS/hypervisor combination. Due to the requirements for paravirtualized split-drivers and prohibitive development and sustenance costs, manufacturers slowly distanced away from device paravirtualization as a solution for software device virtualization. However, because hardware device virtualization (e.g., SR-IOV) drivers require guest-host collaboration with high amount of device-specific intelligence to perform operations such as coordinating power management of devices, split-drivers of paravirtualization still remains a viable solution for I/O virtualization.

The next advancement in tier 3 I/O virtualization was direct device assignment. INTEL and AMD added hardware support for device virtualization. INTEL® VT for directed I/O (VT-d) and AMD's I/O memory management unit (IOMMU) allow a single guest OS instance to exclusively own a device (e.g., a GPU, a storage device, a NIC) while none of the other guests or even the host would be able to use the device while the device is in use. The guest OS may use a native device driver to control the device while VT-d and IOMMU took care of performance issues in software device virtualization such as DMA redirection and interrupt redirection. This allows for a single guest OS to achieve close to native performance for the device, but the exclusive ownership of the device hindered the acceptance of the direct device assignment by the virtualization community. For this reason, direct device assignment is also referred to as a "fixed pass through."

VMWARE®-mediated pass through is a specialized case of direct device assignment (or fixed pass through) that exploits internal architecture details of devices. For example, GPUs support multiple independent contexts and mediated pass-through proposes dedicating just a context, or set of contexts, to a virtual machine (VM) rather than the entire GPU. This enables multiplexing but incurs additional costs. The GPU hardware must implement contexts in a way that they can be mapped to different virtual machines with a low overhead and the host/hypervisor must have enough knowledge of the hardware to allocate and manage GPU contexts. In addition, if each context does not appear as a full logical device, the guest device drivers must be able to handle it. Mediated pass-through lacks interposition features beyond basic isolation. A number of tactics using paravirtualization or standardization of a subset of hardware interfaces can potentially unlock these additional interposition features. For example, the publication entitled "TA2644: Networking I/O Virtualization," VMworld 2008 by Howie Xu, at al. contemplated analogous techniques for networking hardware.

PCI-SIG provides single root I/O virtualization (SR-IOV) that allows device manufacturers to create a single physical device that behave like multiple devices. An SR-IOV device has a single physical function (or physical device) controlled by the hypervisor or VMM, and multiple virtual functions (or virtual devices) each of which can be assigned exclusively to a guest OS. In the case of direct device assignment, VT-d or IOMMU assumes the responsibility for DMA and interrupt redirection. SR-IOV provides better concurrency in the use of the device but still restricted by the finite number of virtual functions that could be accommodated on the hardware device. SR-IOV is gradually gaining adoption in the virtualization community although data centers have to go through extensive infrastructure changes to benefit from SR-IOV.

Nokia contemplated tier 3 device virtualization solution using a system call bridge in United States Patent Application No. 2013/0072260 entitled "Method and Apparatus for Facilitating Sharing Device Connections." The system call bridge is built on the assumption that if a guest OS were to remotely make system calls to the host OS (with appropriate translations in the case of heterogeneous OS'es), host devices could be transparently shared on the guest OS'es. This is a process referred to as system call virtualization. However, system call virtualization that remotes only device operations is impractical or undesirable because the process execution, memory management, information and device management, in that case, will be entirely performed by the host OS. Devirtualization was conceived as a special case of a system call bridge where the operations on selected device files alone are remotely called by the host OS. For example, United States Patent Application No. 2013/0204924 entitled "Method and Apparatus for Providing Application Level Transparency via Device Devirtualization" describes devirtualization.

Devirtualization popularized paravirtualization by removing the need for one driver per each of device/OS/hypervisor combinations. By removing device-specific knowledge from a paravirtualized driver, a single pair of generic (i.e., front-end and back-end) drivers can be used to virtualize many types of devices (e.g., GPUs, sensors) while facilitating (1) the concurrent use of the device across guest OS'es, resulting in higher scalability and utilization of the device and (2) hardware acceleration offered by the device to be used by guest OS'es, resulting in close to native performance. Devices such as GPUs or sensors that do not require a fast response without high volumes of asynchronous operations or DMA/interrupts greatly benefit from devirtualization. Since the devirtualization drivers are devoid of knowledge of any specific devices, the guest OS is required to redirect the virtual file system (VFS) operations for the devirtualized devices (e.g., Linux file_operations) to the devirtualization client driver that works in tandem with the devirtualization host driver on the virtualization host to operate on host devices through the host native device drivers.

Devirtualization virtualizes devices in shared memory domains (e.g., single computers) as well as distributed memory domains (e.g., across a network of computers). For shared memory domains, devices are shared between guest OS'es running on a hypervisor on a shared memory system, thus it is an intrinsic devirtualization. On the other hand, for distributed memory domains, devices are shared between multiple discrete computers (e.g., between a smartphone and a tablet), thus it is an extrinsic devirtualization. Devirtualization has its own limitations, but most importantly devirtualization fails to provide coherent user space device interfaces (e.g., entries in Linux /dev, /sys, /proc filesystems) because the device-specific knowledge out of these drivers was abstracted in favor of genericity of device virtualization. A technical report entitled "Making I/O Virtualization Easy with Device Files" by Ardalan Amiri Sani, et al., Technical Report 2013-04-13, Rice University, April 2013. describes the limitations of devirtualization.

System virtualization infrastructures (e.g., XEN®, KVM, VMWARE® VMI) provided the efficient communication mechanism for a guest OS to context switch into the host. These are similar to system calls that allow applications context switch into the kernel. Context switches can be achieved by software interrupts or VMCALL. Software Interrupts are similar to the system calls and switch to the appropriate ring level to gain the privilege to perform host operations. INTEL® VT provides the VMCALL instruction for a guest to perform an immediate context switch to the host. In VMCALL instruction, one of the arguments indicates a special function that the guest wants the host to perform on its behalf, and the rest of the arguments are operation-specific.

Address space virtualization achieved a significant performance gain for an intrinsic devirtualization. Address space virtualization provides a hybrid address space (HAS) that includes a single address space for the host kernel and guest user mappings while performing devirtualized system call operations in the host and allowing the host kernel to directly access system call arguments (and other information) via virtual address pointers in the guest user application's memory space.

The use of HAS allows enhanced page sharing across OS domains in hypervisor-based system virtualization. Prior examples of page sharing architecture include, but not limited to, XEN® grant tables and VMWARE® transparent page sharing (TPS). For XEN® grant tables, selected memory mappings are shared across guest OS domains (sometimes with the host) to avoid redundant copies of data dealt by device drivers. For VMWARE® transparent page sharing (TPS), when multiple guest OS instances of the same OS function simultaneously, a large number of pages remain identical. The hypervisor shares the backing physical (copy-on-write) pages in the virtual address space of the different guest OS instances. HAS-based page sharing enables a host kernel to directly access any portions of the guest application memory.

The performance of devices such as GPU, storage and NIC usually limits the user experience on a computer system whether it is a physical computer or a virtual computer running on a hypervisor. Operating systems such as Windows, Linux, MacOS, iOS and Android provide native device drivers as closed-source or binary distributions. Some device manufacturers make available an open-source version of their drivers, but they usually withhold many of their intellectual property of their drivers. An efficient software device virtualization architecture works seamlessly and transparently across multiple devices, even when only binary level closed-source drivers are available. In such a case, the software device virtualization architecture particularly precludes any specific knowledge about the devices, or access to sources for the devices drivers to be able to efficiently perform software device virtualization.

SUMMARY

A system and method for providing dynamic device virtualization is herein disclosed. According to one embodiment, the computer-implemented method includes providing a hypervisor and one or more guest virtual machines (VMs). Each guest VM is disposed to run a guest user process and the hypervisor is split into a device hypervisor and a compute hypervisor. The computer-implemented method further includes providing an interface between the device hypervisor and the compute hypervisor. The compute hypervisor manages an efficient use of CPU and memory of a host and the device hypervisor manages a device connected to the host by exploiting hardware acceleration of the device.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

FIG. 11 illustrates an exemplary TDP initialization with a code for context switch, according to one embodiment;

Figure 1:
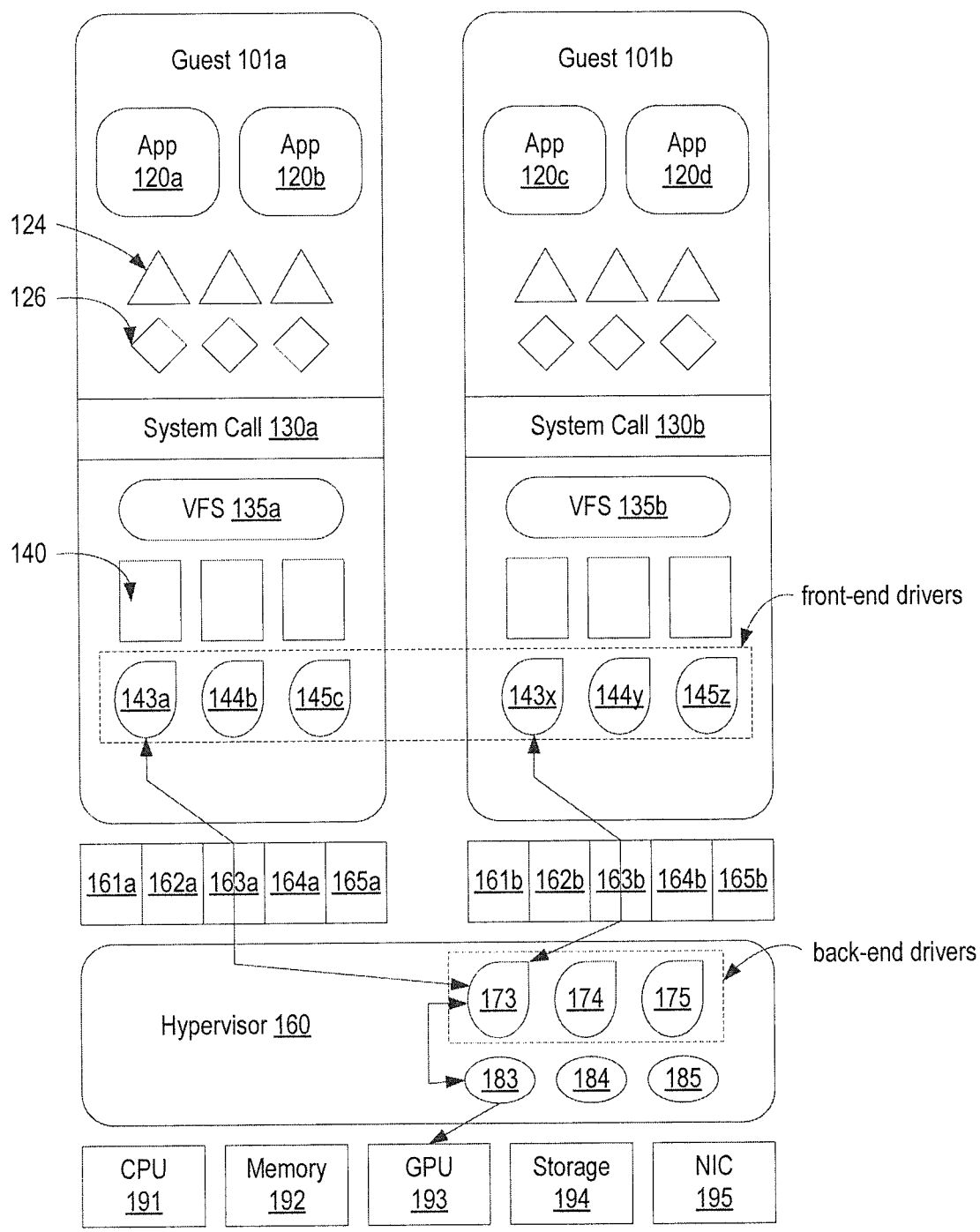
FIG. 1 illustrates a schematic of an exemplary device-specific paravirtualization, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A system and method for providing dynamic device virtualization is herein disclosed. According to one embodiment, the computer-implemented method includes providing a hypervisor and one or more guest virtual machines (VMs). Each guest VM is disposed to run a guest user process and the hypervisor is split into a device hypervisor and a compute hypervisor. The computer-implemented method further includes providing an interface between the device hypervisor and the compute hypervisor. The compute hypervisor manages an efficient use of CPU and memory of a host and the device hypervisor manages a device connected to the host by exploiting hardware acceleration of the device.

These dynamically cloned virtual device drivers are capable of making direct calls into the device driver interface (DDI) APIs of the native device driver on the host, through an efficient, and secure, bi-directional communication between host and guest kernels, also referred to as smart context switch (SCS). The system and method also presents the platformization of dynamic device virtualization, whereby a device hypervisor that is embedded into a processor or system platform, facilitates platform builders to tune and optimize virtualization performance of their respective platforms without a support from software virtualization vendors.

Each of the features and teachings disclosed herein can be utilized separately or in conjunction with other features and teachings to provide a system and method for combining past user events with real-time user events to rapidly respond to advertising opportunities. Representative examples utilizing many of these additional features and teachings, both separately and in combination are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. The steps are not intended to be performed in a specific sequential manner unless specifically designated as such.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or processes presented herein are not inherently related to any particular computer or other apparatus. Various general purpose systems, computer servers, or personal computers may be used with programs in accordance with the teachings herein, or it may prove convenient to construct a more specialized apparatus to perform the method steps. The structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure. It is also expressly noted that the dimensions and the shapes of the components shown in the figures are designed to help to understand how the present teachings are practiced, but not intended to limit the dimensions and the shapes shown in the examples.

According to one embodiment, the present system and method provides dynamic device virtualization (DDV). DDV is a method of software device virtualization that employs a technique referred to as device driver virtualization. A virtual device driver for a guest operating system (OS) is dynamically virtualized (i.e., cloned) from the native device driver that is running on the host of a virtualization platform (e.g., a hypervisor). DDV provides enhanced scalability and device utilization of an existing hardware without requiring special hardware optimization. DDV runs efficiently on a computer system without support for hardware device virtualization such as SR-IOV or MR-IOV.

DDV is economically more viable than conventional software device virtualization techniques such as paravirtualization and devirtualization. To achieve close to native performance, paravirtualization requires device manufactures to provide a pair of split-drivers (i.e., paravirtualized drivers) for each of device/OS/hypervisor combinations. Devirtualization is premature as a virtualization technology and has various limitations; (1) devirtualization works best only on devices with low asynchronous operations and low DMA/interrupt handling such as GPU and sensors, for example, asynchronous operations (e.g., receipt of network packets that require callback into guest operating systems) have to rely on slow virtual interrupts; (2) user space device interfaces (e.g., interfaces provided by Linux pseudo file systems like /sys, /proc. /dev, etc.) are not easily virtualized; (3) live migration is difficult because a lot of guest states are managed on the host; (4) devirtualization needs mediation across guest operating systems to handle many operations, for example, a guest may try to power down a GPU when it is done using it, without the knowledge that other virtual machines are still continuing to use the device; (5) more design level changes are required to make boot devices use devirtualization; (6) devirtualization does not provide easy portability to other operating systems (because it inherently assumes Linux VFS interfaces); and (8) there is no clean separation between compute and device virtualization, hence it is difficult to platformize devirtualization.

The current virtualization market is quickly bracing for a massive and expensive shift towards hardware device virtualization (e.g., SR-IOV and MR-IOV) due to the intrinsic limitations of software device virtualization (e.g., paravirtualization, devirtualization) despite an elevated cost and technical difficulties for transitioning to hardware device virtualization. The present system and method overcomes the drawbacks of conventional software device virtualization techniques and provides a compelling software device virtualization solution as an alternative to hardware device virtualization. DDV exploits the device-specific intelligence of native device drivers to perform software device virtualization. DDV dynamically creates virtual device drivers out of native device drivers that are provided by a device manufacturer for the native host OS (or hypervisor).

According to one embodiment, the present system and method provides device driver virtualization to facilitate effective tier 3 I/O virtualization (e.g., software device virtualization). Devices such as GPU, storage devices and NIC are concurrently accessible by multiple guest OS'es with full hardware accelerations that are supported by their native driver. In one embodiment, an intelligent device manager (DM) that runs on the host OS (or hypervisor) observes the behavior of a native device driver loaded on the host. Examples of observed behaviors of a native device driver includes (a) the registration of the device driver, (b) the virtual file system function tables (i.e., device driver interface (DDI) for the operating system) registered by the device driver, and (c) user space device interfaces (e.g., entries in Linux /sys, /proc, /dev filesystems) that the device driver creates and controls. Based on the observed behavior of the host native device driver, the intelligent device manager dynamically creates one or more virtual device drivers to run in the guest OS context. The virtual device drivers are capable of directly invoking APIs (or callbacks) implemented by the native device driver, and performing device management chores on the host that are originally performed only by the native device driver. Thus, the native device driver is virtually shared between the host and the guest OS domains. The execution context of the native device driver on the host is virtually extended into each of the guest OS contexts.

The present system and method further provides a fast, efficient, and secure bi-directional context switching between the host and the guest by employing address space virtualization. The address space virtualization eliminates the need to interrupt execution contexts for context switching between the guest and the host.

According to one embodiment, the present system and method provides user space device interface virtualization. The user space device interface virtualization provides the referential transparency of user space interfaces for the host devices in a guest OS. For example, references to /dev, /sys, /proc, etc. on a Linux guest OS are provided by dynamically resolving from the host through a virtualization interface and ensuring the coherency of the information between the host (e.g., state and configuration settings of the device) and the guest (e.g., MAC and IP addresses that are customized for the guest OS).

The present system and method provides a generic solution to virtualize different types of devices including input devices (e.g., touch pad, mouse, and keyboard), graphics processing units (GPUs), storage devices, network interface cards (NICs), and sensors (e.g., an accelerometer, a compass, a global positioning system (GPS)). Some class-specific specializations may be required depending on the type of virtualized devices.

Only the host kernel is required to have special intelligence about DDV but neither the guest OS kernel nor the native device drivers need to know whether they are being virtualized. Some special drivers will need to be loaded on the guest OS. DDV works in two modes. The first mode does not require any changes to native device drivers, and the best performing "closed-source" native device drivers are used. However, some operations may require some level of arbitration among guest OS'es that are concurrently using a host device, where the operation by one guest OS affects the operation of other guests OS'es, for example, when a guest OS requests a device to be powered down, it may not be aware that other guest processes are currently using the host device. The second mode of DDV requires minimal changes to native device drivers. The changes are made to the "open source" native device drivers that may not be necessarily the best performing drivers. Due to the expected benefits and scalability, device manufacturers may choose to provide "closed source" native device drivers specifically optimized for DDV. As in the case of devirtualization, DDV supports both Intrinsic and extrinsic modes of software device virtualization. The extrinsic mode can be visualized as an intrinsic mode operating over a distributed shared memory (DSM) architecture.

According to one embodiment, the present system and method works on an INTEL x86 based Linux host. However, it is contemplated that the present system and method is applicable across various types of processors and OS architectures without deviating from the scope of the present subject matter. Such examples include, but are not limited to, AMD x86 and ARM processor based systems running various OS'es such as Linux, Windows, Android, and Mac OS.

The present system and method for providing dynamic device virtualization can be deployed in various forms. According to one embodiment, the present system and method provides enhancement to a classical hypervisor such as XEN®, KVM, VMWARE®, Hyper-V by implementing intelligence to perform dynamic device virtualization. According to another embodiment, the present system and method provides platformization in which a hypervisor bifurcates into a compute hypervisor and a device hypervisor, and the device hypervisor is embedded into the platform. While the classical hypervisor continue to serve as a compute hypervisor for virtualizing CPU and memory, the new device hypervisor assumes the responsibility of virtualizing hardware devices such as a GPU, a storage device, a network device, and a sensor.

FIG. 1 illustrates a schematic of an exemplary device-specific paravirtualization, according to one embodiment. A guest OS (e.g., 101a or 101b) runs one or more applications 120. During the startup of the guest OS, virtual front-end device drivers are loaded for all virtual devices created by the virtualization host for the guest operating system 161-165 (typically arranged on a virtual PCI bus). Examples of virtual front-end device drivers include front-end GPU driver 143, front-end storage driver 144, and front-end NIC driver 145. These front-end device drivers create the appropriate device nodes 124 (e.g., entries in Linux /dev file system) and user mode device interfaces 126 (e.g., entries in Linux /sys and /proc filesystems) needed to open and control the device from guest user applications. The guest OS 101 also has a virtual file system 135 built into its kernel. Virtual file system 135 is the common entry point for all file operations. Operating systems like Linux treat devices and files as indistinguishable from each other. When a guest user application opens a device, the operating system provides it with a unique handle (user mode file descriptor) to perform I/O operations. File/inode descriptors 140 are the kernel data structure corresponding to such user mode file descriptors. Hypervisor 160 has counterpart back-end drivers including back-end GPU driver 173, back-end storage driver 174, and back-end NIC driver 175. When a guest user application performs a graphics operation, graphics system calls 130 go through the virtual file system 135, front-end GPU virtual device driver 143, back-end GPU virtual device driver 173, and the host native GPU device driver 183 to operate on the host GPU device 193. Similarly, storage system calls 130 operate on host storage device 194, and network system calls 130 operate on host NIC device 195. The pairs of split-drivers including front-end drivers 143, 144, 145, and back-end drivers 173, 174, 175 collaborate with each other to operate on the host devices including host GPU device 193, host storage device 194, and host NIC device 195, through the native GPU driver 183, native storage driver 184, and native NIC driver 185 when executing guest applications 120. Because the split-drivers have device-specific knowledge, the guest application 120 is benefited from device optimization (e.g., hardware acceleration) available in the actual hardware device.

Figure 2:
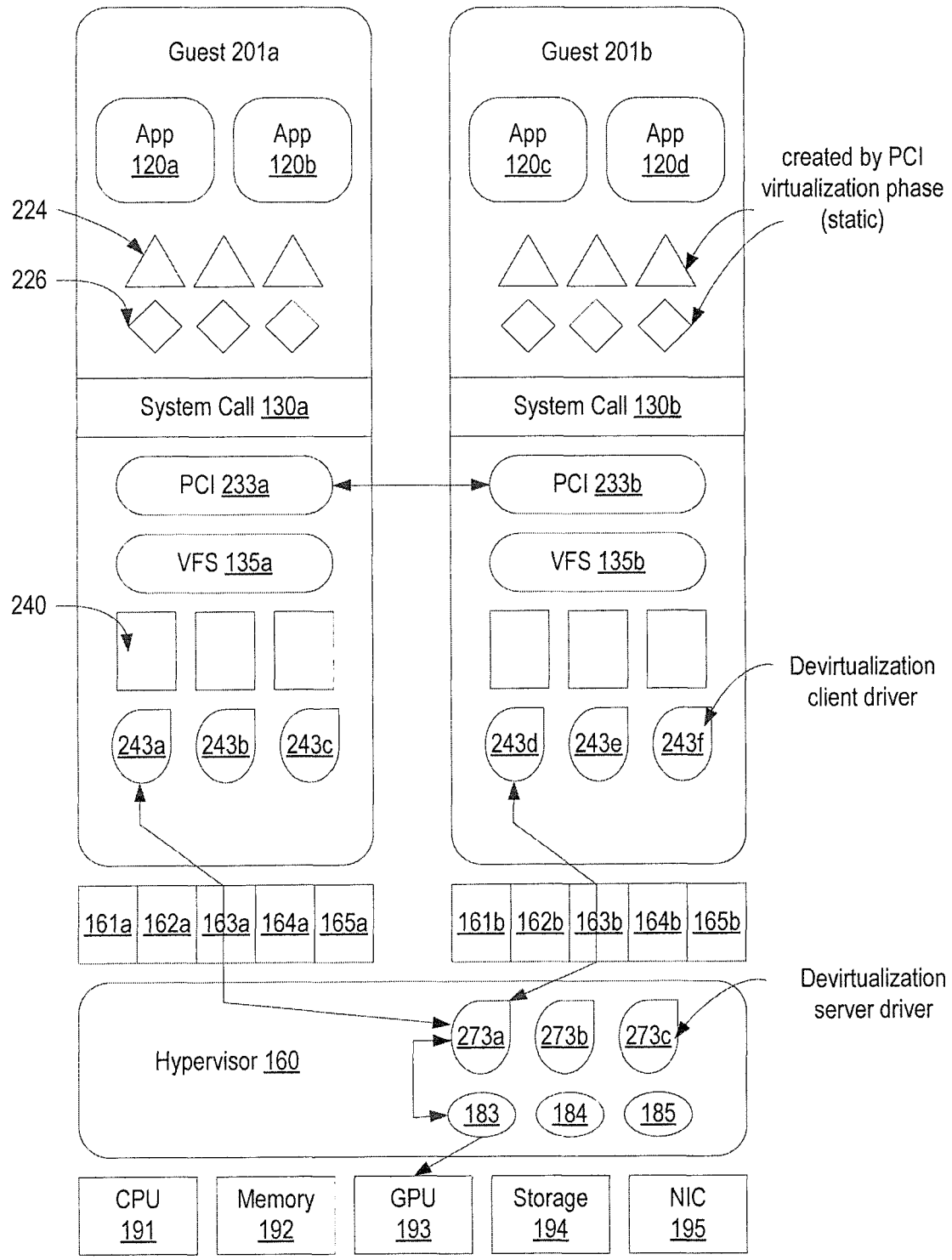
FIG. 2 illustrates a schematic of an exemplary devirtualization, according to one embodiment.

FIG. 2 illustrates a schematic of an exemplary devirtualization, according to one embodiment. Devirtualization removes the device-specific knowledge from split-drivers of paravirtualization, thus removes the need for one driver per each of device/OS/hypervisor combinations. A single pair of generic front-end driver 243 and generic back-end driver 273 is used to virtualize different types of devices (e.g., GPU 293, storage 294, NIC 295, sensors). The generic front-end driver 243 and back-end driver 273 are also referred to as devirtualization client driver and devirtualization server driver respectively. Similar to paravirtualization, the generic front-end and back-end driver pairs 243 and 273 collaborate with each other to operate on the corresponding host devices such as GPU 293, storage 294, and NIC 295 through the native GPU driver 283, native storage driver 284, and native NIC driver 285. Device nodes (e.g., entries in Linux /dev filesystem) 224 and use mode device interfaces (e.g., entries in Linux /sys and /proc filesystems) 226 are created by static PCI virtualization 233.

Paravirtualization and devirtualization provide the efficiency of software device virtualization. Since device-specific intelligence is propagated up to guest OS'es, for example, using split-driver architecture, applications from multiple guest OS'es can see and concurrently use the host devices, thereby enhancing device scalability and utilization while exploiting hardware accelerations and achieving close to native performance.

Figure 3A:
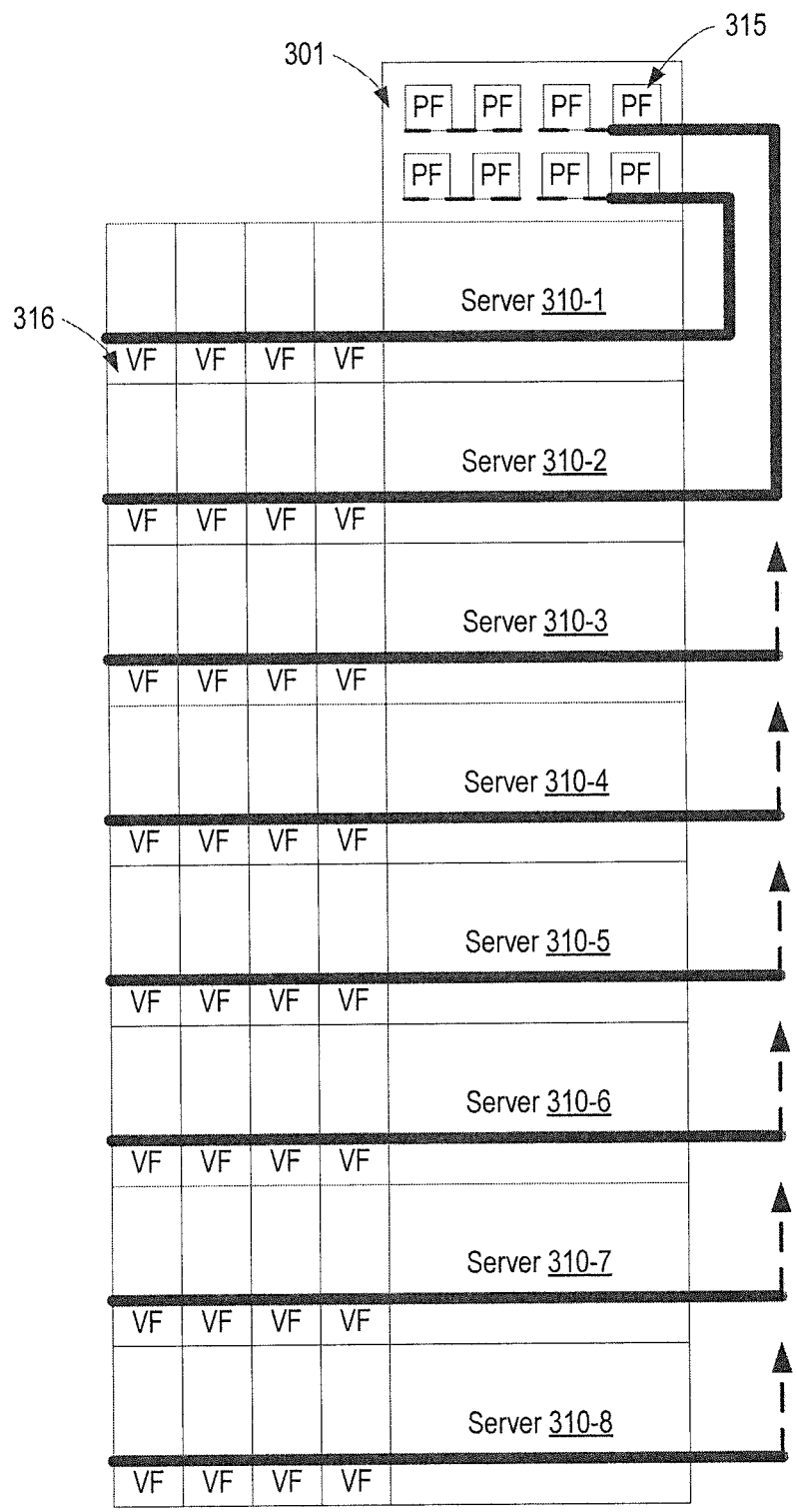
FIG. 3A illustrates a schematic diagram of exemplary hardware device virtualization based on single root I/O virtualization (SR-IOV), according to one embodiment.

Dynamic device virtualization provides better scalability and device utilization compared to hardware device virtualization such as SR-IOV. FIG. 3A illustrates a schematic diagram of exemplary hardware device virtualization based on single root I/O virtualization (SR-IOV), according to one embodiment. A data center rack 301 provides 8 SR-IOV GPUs, one for each of the 8 servers 310-1 to 310-8. In FIG. 3A, each SR-IOV GPU is a single physical device (or physical function (PF) 315) that presents itself to an OS or a virtualization host (e.g., hypervisor) as multiple virtual functions (VFs) 316. Each GPU has one physical function 315 and can support four virtual functions 316. Each of these virtual functions 316 can be directly assigned to a VM that runs a guest OS. Thus, the SR-IOV GPU can support up to four VMs per server, supporting a total of 32 VMs across the 8 severs 310-1 to 310-8.

Figure 3B:
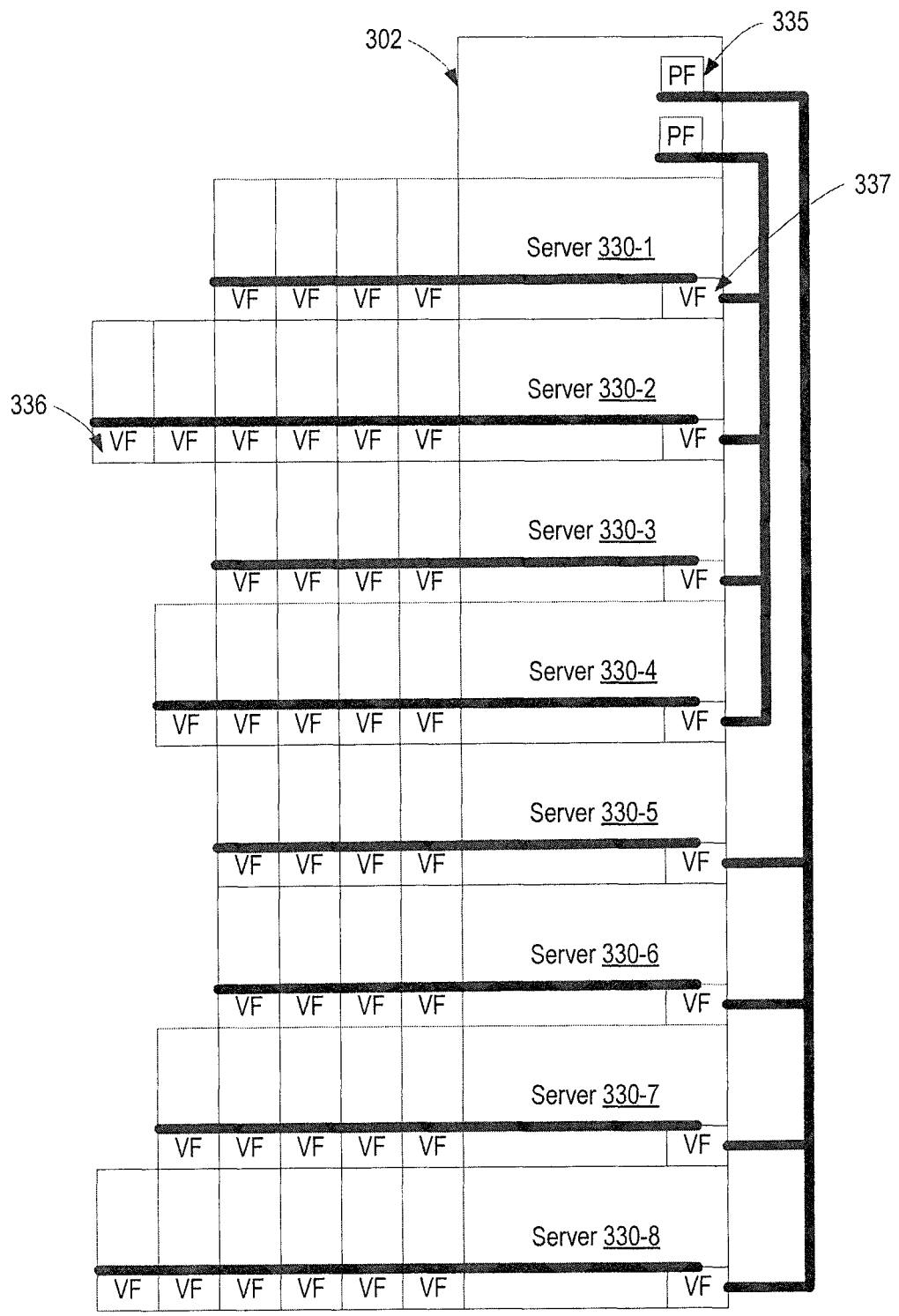
FIG. 3B illustrates a schematic diagram of exemplary dynamic device virtualization for demonstrating the scalability and device utilization, according to one embodiment

FIG. 3B illustrates a schematic diagram of exemplary dynamic device virtualization for demonstrating the scalability and device utilization, according to one embodiment. Data center rack 302 provides two GPUs for 8 servers 330-1 to 330-8. Instead of the servers 310 of FIG. 3A that are provided with a single physical function 315, each server 330 has only one hardware virtual function 337. DDV treats the hardware virtual function 337 as a real GPU and further creates software virtual functions 336. Thus, DDV can support more virtual machines with fewer number of hardware SR-IOV GPUs. In the example of FIG. 3B, two physical GPUs support eight hardware virtual functions 337, each of which is assigned to one of 8 servers 330-1 to 330-8. DDV creates numerous software virtual functions 336 each of which is assigned to a virtual machine. Thus, more virtual machines can concurrently and efficiently share a SR-IOV device's virtual functions.

Figure 4:
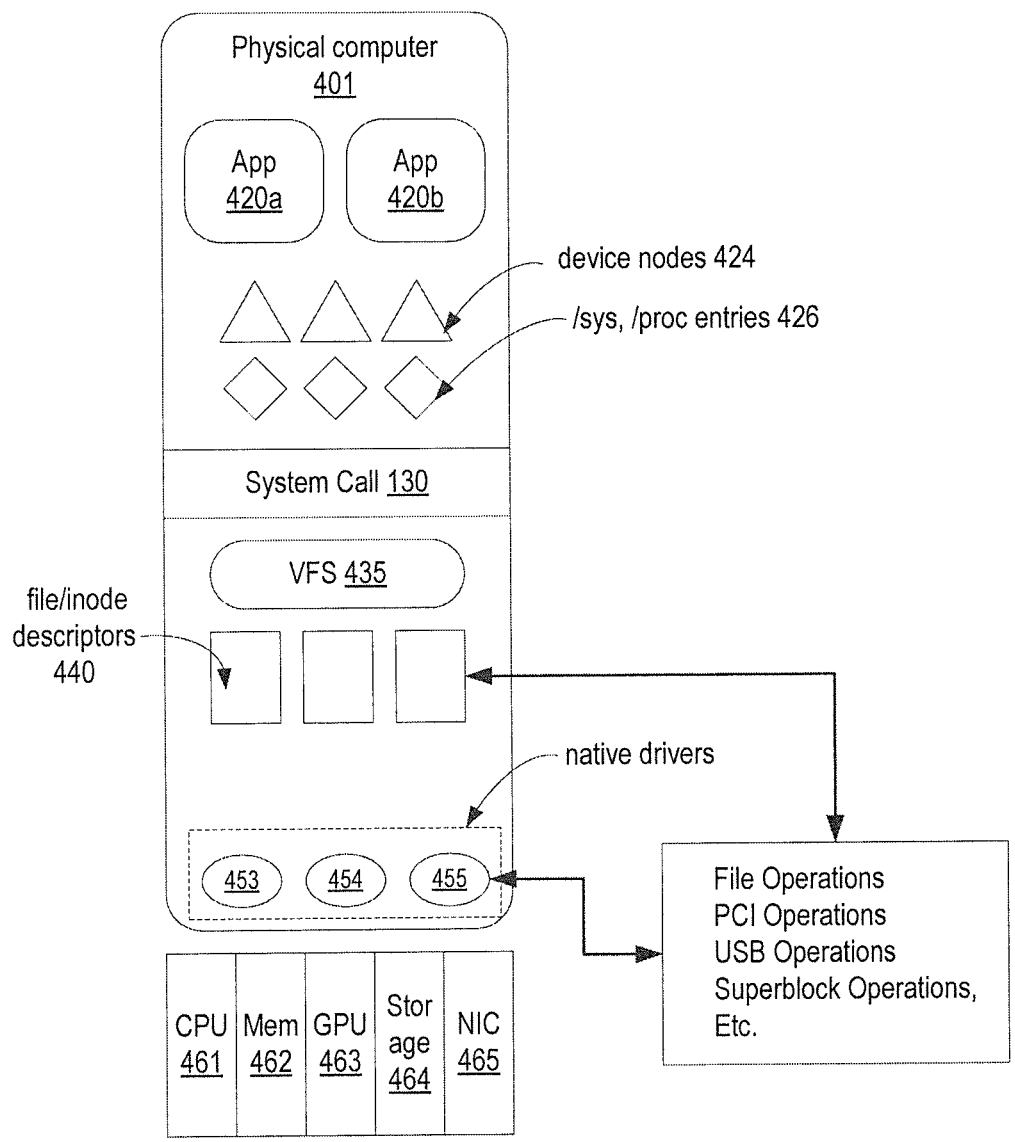
FIG. 4 illustrates exemplary roles of a device driver in a native operating system, according to one embodiment.

FIG. 4 illustrates exemplary roles of a device driver in a native operating system, according to one embodiment. After physical computer 401 successfully boots up, device drivers including GPU device driver 453, storage device driver 454, and network device driver 455 are loaded. The loaded device drivers are identifiable by their vendor or device ID. For example, Linux provides abstraction to a device major number. Each of the device drivers 453-455 further creates the device nodes 424 (e.g., entries in Linux /dev filesystem) and user space device interfaces 426 (e.g., entries in Linux /sys and /proc filesystems) and provides the definitions of the device handling APIs that include operations of virtual file system (VFS) 435 (e.g., file_operations), PCI/USB bus operations, operations to be performed for file systems, TCP/IP, socketcalls, etc. Now the physical computer 401 is ready to run applications 420 and the applications 420 can operate on the devices like GPU 463, storage 464, and NIC 465 through the corresponding native drivers 453-455.

In a simplified example, the direct rendering manager (DRM) native device driver for a GPU performs initializations as follows:

register_chrdev(DRM_MAJOR, "drm", &drm_fops);
drm_class=drm_sysfs_create(THIS_MODULE, "drm");
drm_proc_root=proc_mkdir("dri", NULL);

The Linux host OS intercepts calls made by a device driver and registers the device driver as the handler for all devices with major number=DRM_MAJOR. The Linux host OS registers drm_fops as the table of VFS operations (file_operations) that define entries points in the driver for system call handlers for operations like open, close, read, write, mmap etc. These tables of VFS operations are registered with each file/inode 440 opened for the devices with major number=DRM_MAJOR. The Linux host OS further creates the appropriate device node 424 (e.g., /dev/dri/card0 in /dev file system) and then creates the user mode device interfaces 426 (e.g., entries in Linux the /sys and /proc filesystems) for the DRM driver. All status and configuration information pertaining to the device and driver resides in the /sys and /proc file system nodes.

Applications 420 can open the device node 424 (e.g., /dev/dri/card0) to access the device (e.g., GPU 463). The resulting file/inode descriptors 440 are associated with drm_fops table as the VFS handler for the device. The subsequent calls to system calls such as read, write, ioctl, mmap, close, etc. performed through those file descriptors are redirected to the DRM driver through the appropriate functions registered in the drm_fops table in the VFS layer.

In the case of DDV, once the host OS boots up, it starts the device manager that listens for operations encountered by the host OS when it loads the native device drivers and operates on the host devices. This process is referred to as device driver virtualization. According to one embodiment, the host performs device driver virtualization in two phases.

In the first phase, the host device configuration is notified to a guest OS. The notification may occur in two ways, i.e., push or pull. The push notification is via a virtual PCI bus (virtual PCI bus notification, or VPB-NOTIFICATION). The host creates a virtual PCI bus with fake virtual PCI devices corresponding to the host native devices, and pushes the virtual PCI bus up to the guest as part of its VM specification. The pull notification is via a device manager client 541 (device manager client notification, DMC-NOTIFICATION). During the early phase of booting of the guest OS, a device manager client 541 performs a hypercall to the host to pull a list of virtual device configurations, and the corresponding virtual device drivers to be loaded on the guest OS.

In the second phase, virtual device drivers are cloned from native device drivers. The cloning of virtual device drivers may occur in two ways, i.e., dynamic driver configuration and dynamic driver generation. In the case of dynamic driver configuration (dynamic driver configuration based cloning, DDC-CLONING), the guest OS is statically installed with a list of stub device drivers, which is based on the notification of the first phase, and gets loaded to process the virtual devices. During initialization (e.g., PCI probe phase), the stub drivers make hypercalls to the host to clone themselves, and thereby enabling themselves to make direct calls into DDI APIs of the host native device drivers. In the case of dynamic driver generation (dynamic driver generation based cloning, DDG-CLONING), the host generates a set of fully functional virtual device drivers that knows how to directly call into the DDI APIs of the host native device drivers, and pushes them up to the guest OS (e.g., through a hidden RAMDISK or through the device manager client 541). In both forms of cloning DDC and DDG, a table of VFS operations (e.g., temp_fops) is created on the guest with direct pointers into the native device driver's VFS operations. The smart context switch facilitates a direct call from the guest through the cloned VFS operations table (e.g., temp_fops) into the host kernel's VFS function for a specific operation.

Figure 5:
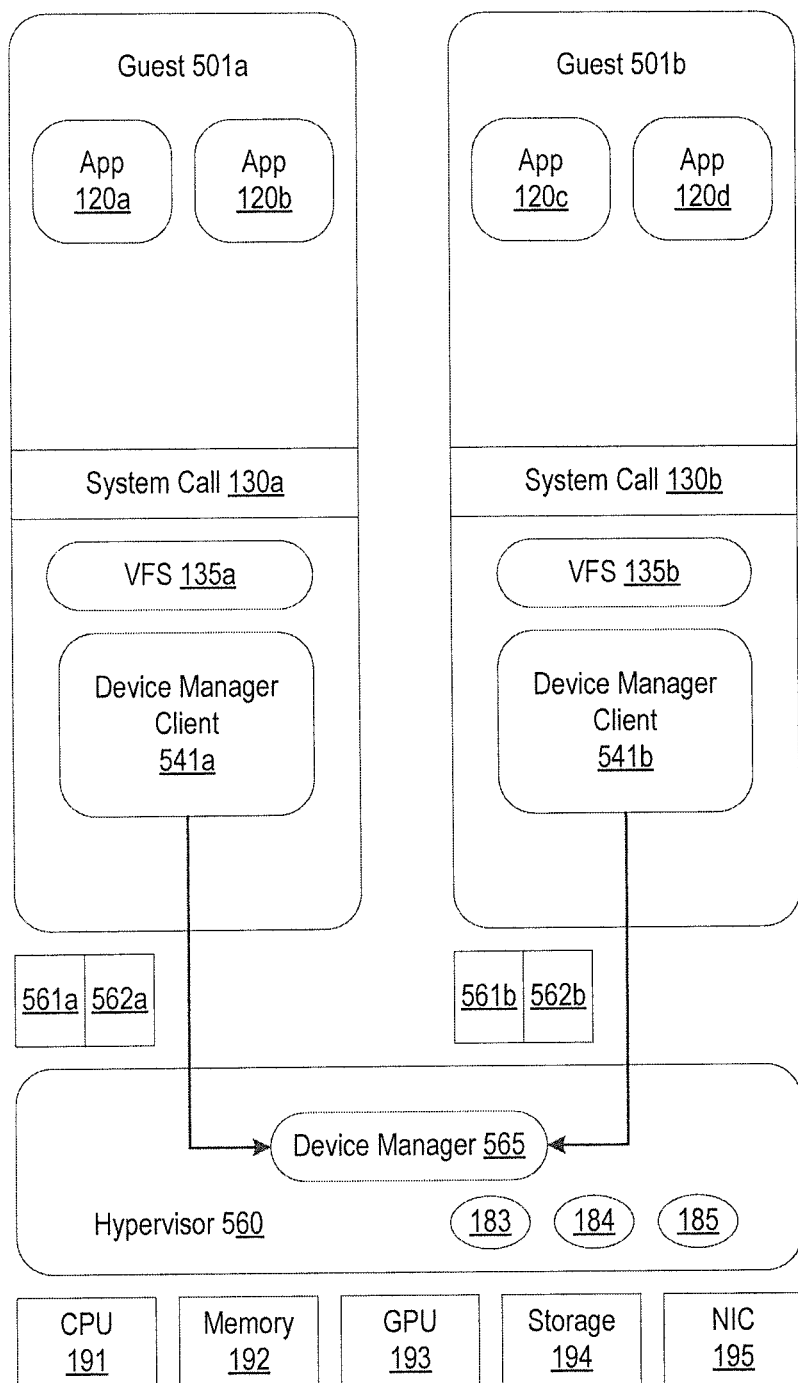
FIG. 5 illustrates an exemplary combination of DMC-NOTIFICATION and DDG-CLONING, according to one embodiment.

FIG. 5 illustrates an exemplary combination of DMC-NOTIFICATION and DDG-CLONING, according to one embodiment. During the early phase of boot-up, the guest OS starts a device manager client 541 that performs a hypercall to the host requesting it to clone a list of virtual device drivers. The device manager server 565 responds by returning a memory mapped image of virtual device drivers for each of the devices requested by the guest OS.

Figure 6:
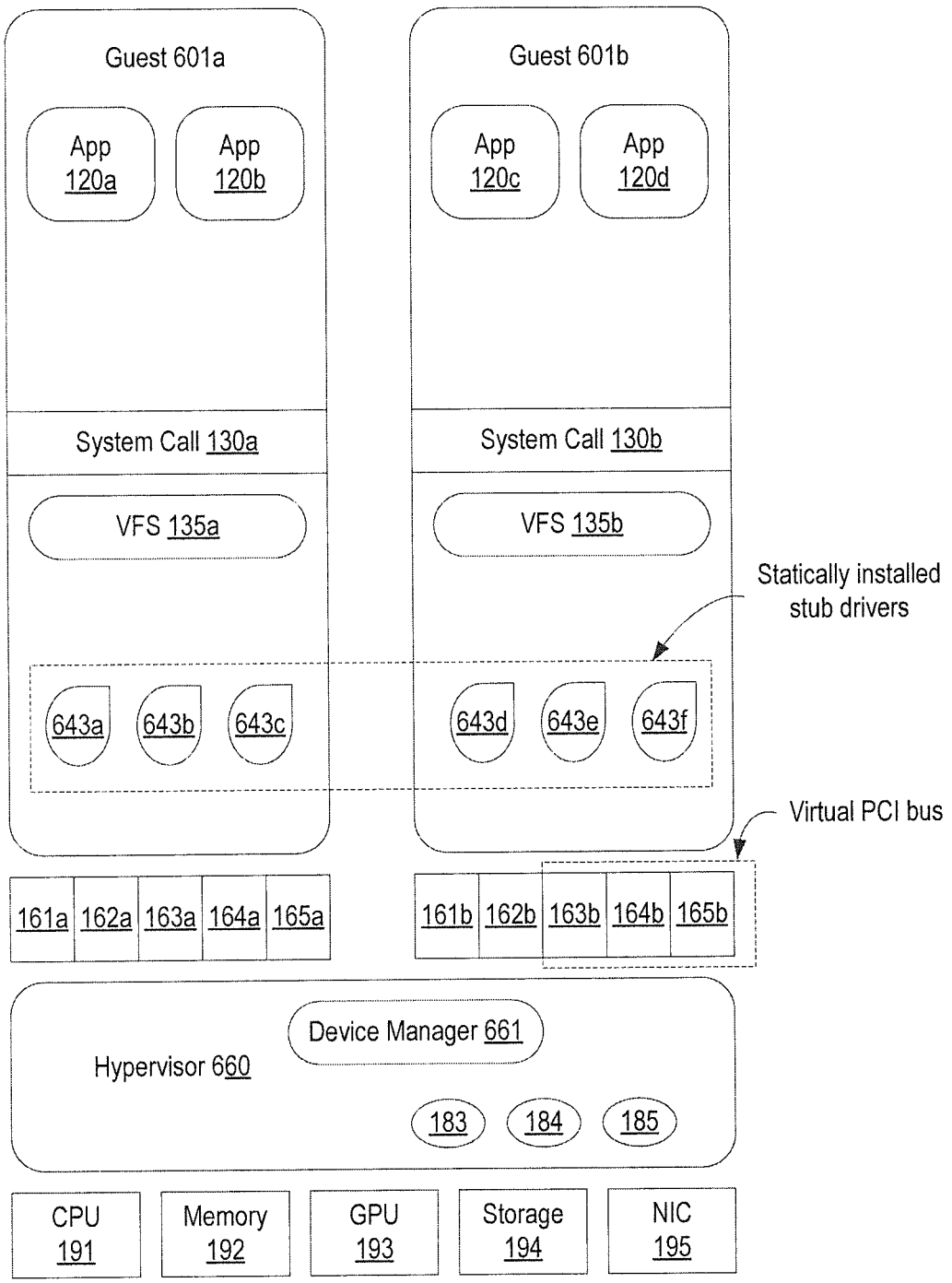
FIG. 6 illustrates an exemplary combination of VPB-NOTIFICATION and DDC-CLONING, according to one embodiment.

FIG. 6 illustrates an exemplary combination of VPB-NOTIFICATION and DDC-CLONING, according to one embodiment. During the installation of the guest OS, static stub device drivers 643 are installed corresponding to the host native device configuration. When the guest is booted each time, the device manager on the host creates a virtual machine description of virtual PCI devices corresponding to the host native devices arranged on a virtual PCI bus 161-165. The guest loads the appropriate stub device driver 643 as identified by the PCI configuration. The stub device drivers make hypercalls to the host device manager 661 to dynamically configure the stub device drivers into fully functional virtual device drivers that can make direct calls into the DDI APIs of the host native device drivers.

Figure 7:
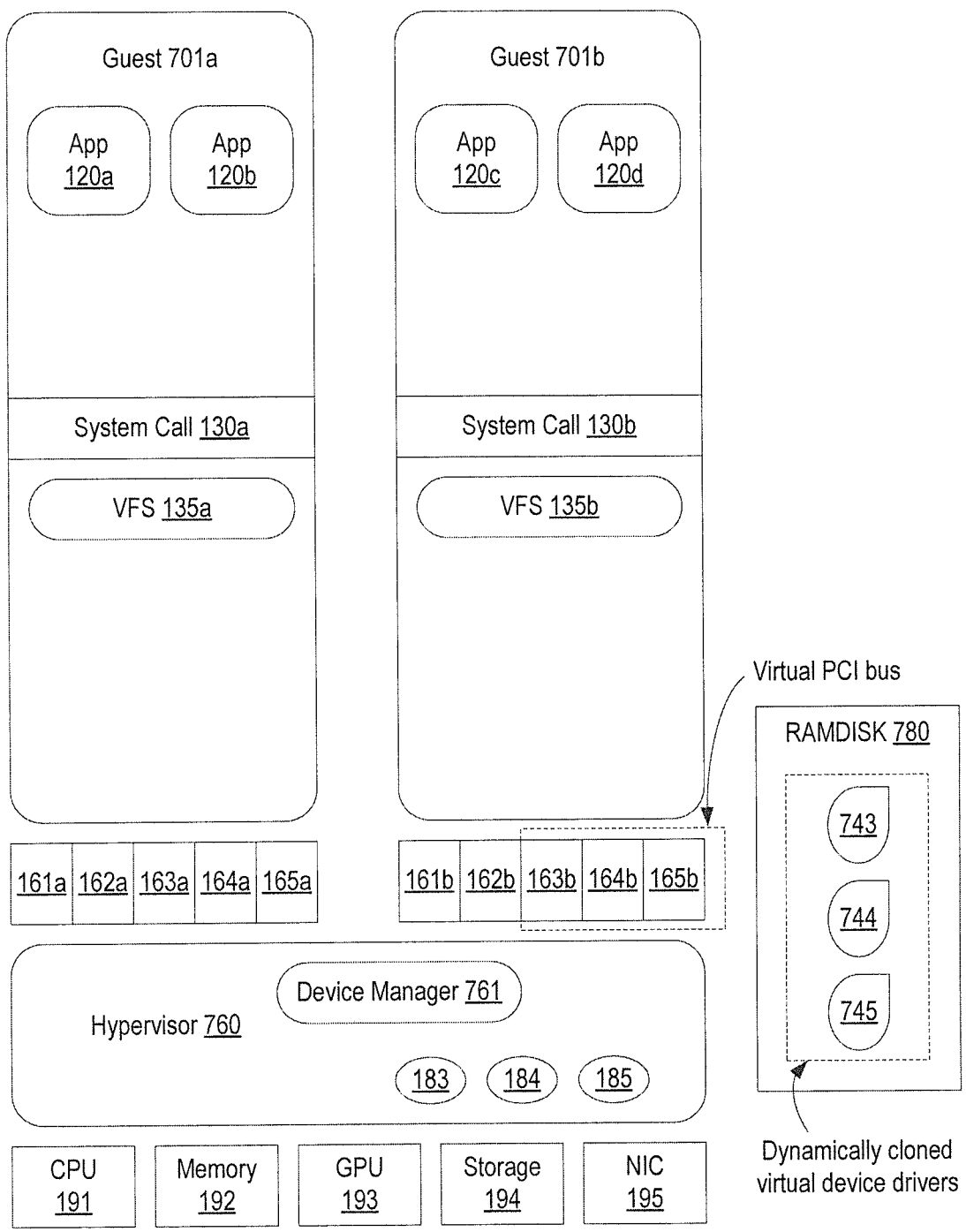
FIG. 7 illustrates an exemplary combination of VPB-NOTIFICATION and DDG-CLONING, according to one embodiment.

FIG. 7 illustrates an exemplary combination of VPB-NOTIFICATION and DDG-CLONING, according to one embodiment. The device manager on the host creates a virtual machine description comprising of virtual PCI devices corresponding to the host native devices arranged on a virtual PCI bus 161-165. A RAMDISK passed as a hidden device to the guest OS contains the cloned virtual device drivers for the previously created virtual PCI devices. The normal PCI enumeration identifies these devices and loads the newly cloned virtual device drivers.

Figure 8:
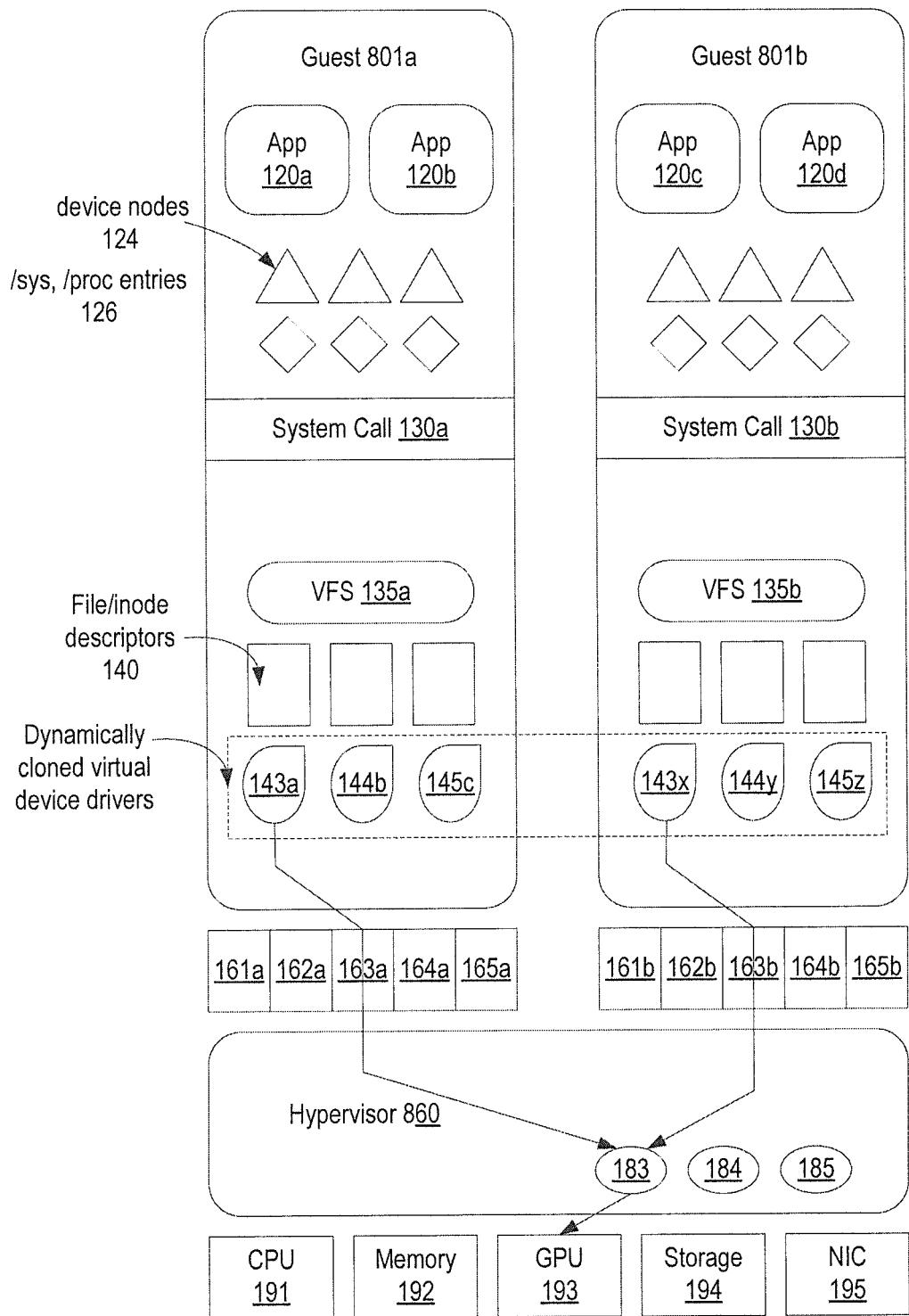
FIG. 8 illustrates an exemplary state of a guest OS after device driver virtualization, according to one embodiment.

FIG. 8 illustrates an exemplary state of a guest OS after device driver virtualization, according to one embodiment. Referring to the previous example, the virtual device driver cloned from the DRM GPU native device driver performs similar operations on the guest OS as was performed on the host by the native device driver. The virtual device driver cloned from the DRM GPU native device driver registers itself as the handler for all devices with major number=DRM_MAJOR. The virtual device driver registers a table of VFS operations for devices with major number=DRM_MAJOR on the guest OS in such a way that each of the operations on this device (e.g., open, read, write, ioctl, mmap, close, etc.) translates into a direct call into the corresponding operations in drm_fops table in the host kernel (i.e., the entry points in the native device driver DDI API).

According to one embodiment, the direct call is facilitated by a guest-to-host smart context switch. The virtual device driver maintains the necessary states needed to communicate with the DDI APIs of the host native device driver (e.g., file/inode descriptors on the host) and any specific information that may be virtualized (e.g., guest MAC or IP address).

The virtual device driver further creates the device node (e.g., in Linux /dev filesystem) and virtual entries for user space device interface (e.g., in Linux /sys, and /proc filesystems) on the guest corresponding to the DRM driver in such a way that references to these entries are dynamically resolved from the host with appropriate virtualizations applied. For example, guest MAC or IP address are resolved from a location known to the guest OS, but not from the host.

Once the guest has loaded the virtual device drivers cloned for it by the host device manager, the guest can transparently operate on the host devices through the native device drivers. Thus, the guest OS can use the host devices even during the boot process if the native device driver is permitted for a boot time use on the native system.

According to one embodiment, the present system and method provides a smart context switch. The smart context switch enables fast, efficient, and secure, bi-directional communication between guest OS'es and the host. For guest-to-host communication, smart context switch provides a direct call into DDI APIs of native device driver. For host-to-guest communication, the smart context switch provides notification of asynchronous I/O completion, notification of inbound network packets. The host ensures that the guest is running prior to initiating the host-to-guest communication.

Hypercalls are used in system virtualization infrastructures such as XEN®, KVM, VMWARE® to allow guest OS'es to context switch into the host to perform supervisory virtualization functions. In general, hypercalls are complicated and time consuming, and pose various security risks. Compared to hypercalls, the present smart context switch is fast, efficient, and secure. In addition, the present smart context switch provides the benefit of bi-directional communication between guest OS'es and the host.

According to one embodiment, the present smart context switch is performed in various ways. Examples of such smart context switch include, but are not limited to, hybrid address space based smart context switch (HAS-SCS), kernel address space partition based smart context switch (KASP-SCS), and dynamic translation based smart context switch (DT-SCS).

Hybrid address space based smart context switch (HAS-SCS) is based on a hybrid address space (an address space virtualization technique) that configures paging architecture to access memory in host kernel and guest user spaces using virtual addresses in these two spaces respectively. While an application is in the guest context, it can execute host kernel code directly. On the other hand, while an application is in the host context, it can access data from guest user memory.

Figure 9:
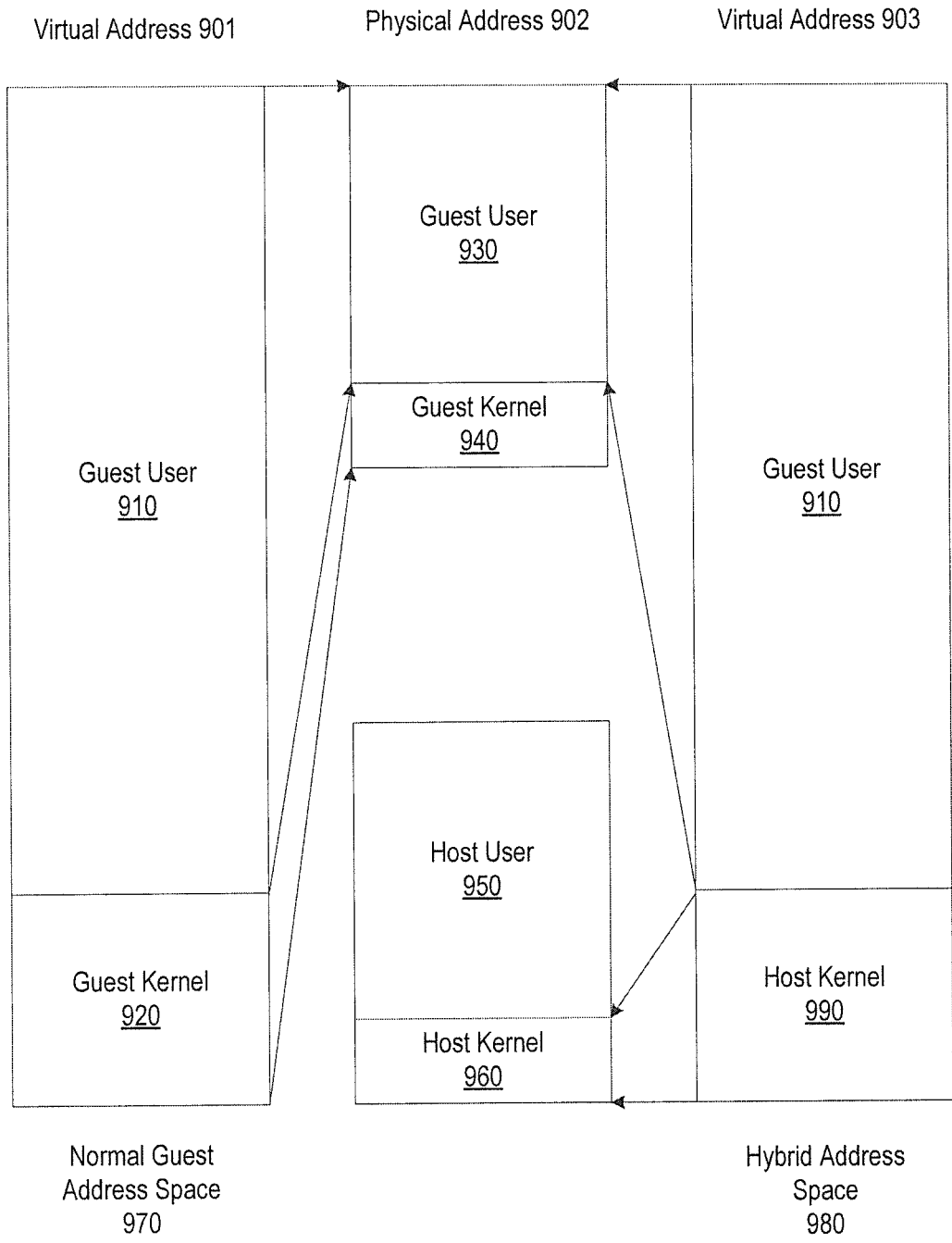
FIG. 9 illustrates an exemplary hybrid address space, according to one embodiment.

FIG. 9 illustrates an exemplary hybrid address space, according to one embodiment. The virtual address space 901 of a guest application 970 has a guest user address space 910 and guest kernel address space 920. The physical memory address 902 maps guest user virtual address space 910 to physical memory 930, guest kernel virtual address space 920 to physical memory 940, host user virtual address space (not shown) to physical memory 950, and host kernel virtual address space 990 to physical memory 960. The virtual address space 903 of a hybrid address space 980 of the same user application has guest user virtual address space 910 and host kernel address virtual address space 990. When the hybrid address space 980 is enabled, the guest user context can directly call into a code inside the host kernel virtual address space, and the host kernel can directly access memory mapped to guest user virtual address space. In one embodiment, the hybrid address space is implemented using INTEL® virtualization technology (VT) using an extended page table (EPT). It is contemplated that similar hybrid address space solutions are possible with hardware virtualization architectures for other types of processors such as AMD x86, ARM. It is also contemplated that similar hybrid address space solutions are possible with conventional software memory virtualization architectures (e.g., software shadow page tables).

The hypervisor (or host OS) needs to maintain the infrastructures to enable HAS-SCS. For every address space (or process, task) in every guest OS, the hypervisor builds and maintains a hybrid address space and it is kept in sync with the normal guest address space. In one embodiment, INTEL® VT enables efficient mechanisms to build a hybrid address space.

The hypervisor dedicates a secret trap door page (TDP) for the bi-directional context switches. In one embodiment, the TDP page is maintained execute-only (i.e., read/write protected) by using the INTEL® VT feature of extended page table (EPT). The TDP pages require identical virtual address mapping in both the host OS as well as in the guest OS to ensure that instructions can execute even after switching page tables. The TDP is initialized by the hypervisor with a code for efficient context switch.

Figure 10:
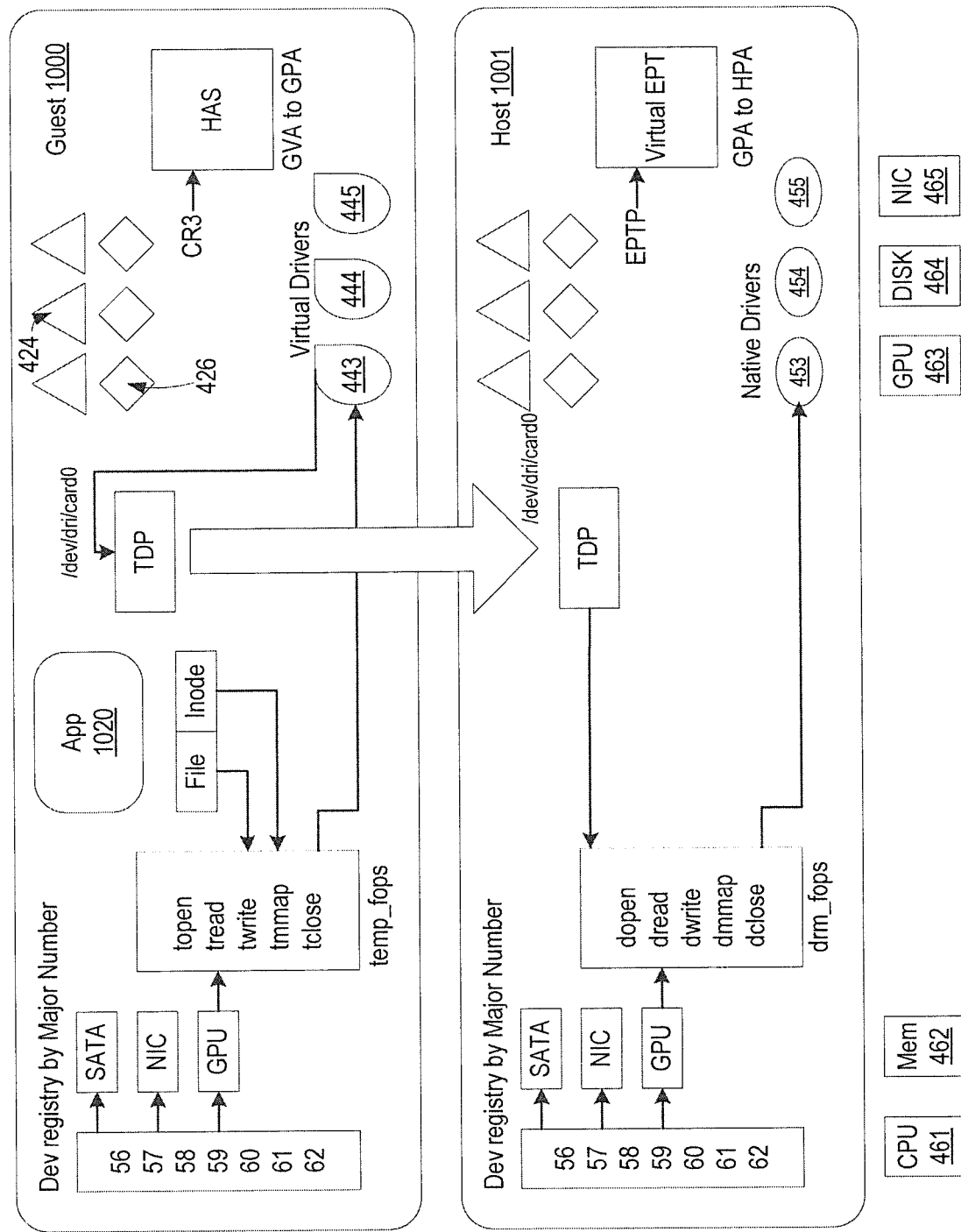
FIG. 10 illustrates the process of an exemplary smart context switch, according to one embodiment.

FIG. 10 illustrates the process of an exemplary smart context switch, according to one embodiment. The cloned DRM GPU virtual device driver 443 on guest 1000 registers temp_fops as its VFS interface (file_operations) for devices with major number=DRM_MAJOR. When a guest application 1020 opens this device using the device node (/dev/drv/card0), the file and inode descriptors have the VFS handlers initialized to temp_fops. When the guest application 1020 performs a file operation, for example, a read operation, the VFS method "topen" is invoked as shown in FIG. 11, causing the transfer of control to the appropriate function in drm_fops on the host 1001 that has the VFS handler in the native GPU device driver 453 for the read operation. The device driver 453 performs the requested read operation on the GPU hardware 463 and lets the control return back to the TDP that appropriately reinstates control back in the guest virtual driver 443 that initiated the operation.

FIG. 11 illustrates an exemplary TDP initialization with a code for context switch, according to one embodiment. The pseudo code shows how the control of a file read operation is transferred from a guest application to the host. The function ExecuteOnHost of DRM GPU virtual driver 1101 facilitates a direct call into the host native device driver entry points defined in drm_fops. The function ExecuteOnGuest of trap door page 1102 is for host-to-guest calls to perform special chores such as reporting asynchronous I/O completion and reporting the receipt of network packets, etc.

The present system and method employs an authenticated kernel module architecture, according to one embodiment. The authenticated kernel module architecture prevents unauthorized calls into the DDI APIs of the host native device drivers. All direct calls from guest virtual device drivers into host native device drivers (e.g., DDI APIs) are authenticated using a cryptographic key.

The HAS-SCS is secure. During guest-to-host context switch, all sensitive information used from the host are contained in the execute-only TDP page, thus no guest process can read or modify the TDP page. Examples of sensitive information include, but not limited to, the address of host kernel functions in drm_fops (i.e., VFS interface to host native device driver) and the hybrid address space. All direct calls from guest virtual device drivers into host native device driver (DDI APIs) are authenticated using the authenticated kernel module architecture. The security of host-to-guest context switch is substantiated because the virtualization host is part of the trusted code base (TCB) and is guaranteed to never perform any malicious operations.

The kernel address space partition based smart context switch (KASP-SCS) is less restrictive than HAS-SCS. The context switch by HAS-SCS is restrictive because it switches context to the entire host kernel space to be able to directly access and executes only a small portion of code that includes the native device drivers. According to one embodiment, KASP-SCS rearranges the components in the kernel address space to form two segregated address spaces, one for compute operations (compute address space) and the other for device operations (device address space). The compute address space spans all aspects of the kernel up to the device driver interface while the device address space spans the address space that is responsible for handling device operations including the device driver interface, bus driver interface, etc.

Figure 12:
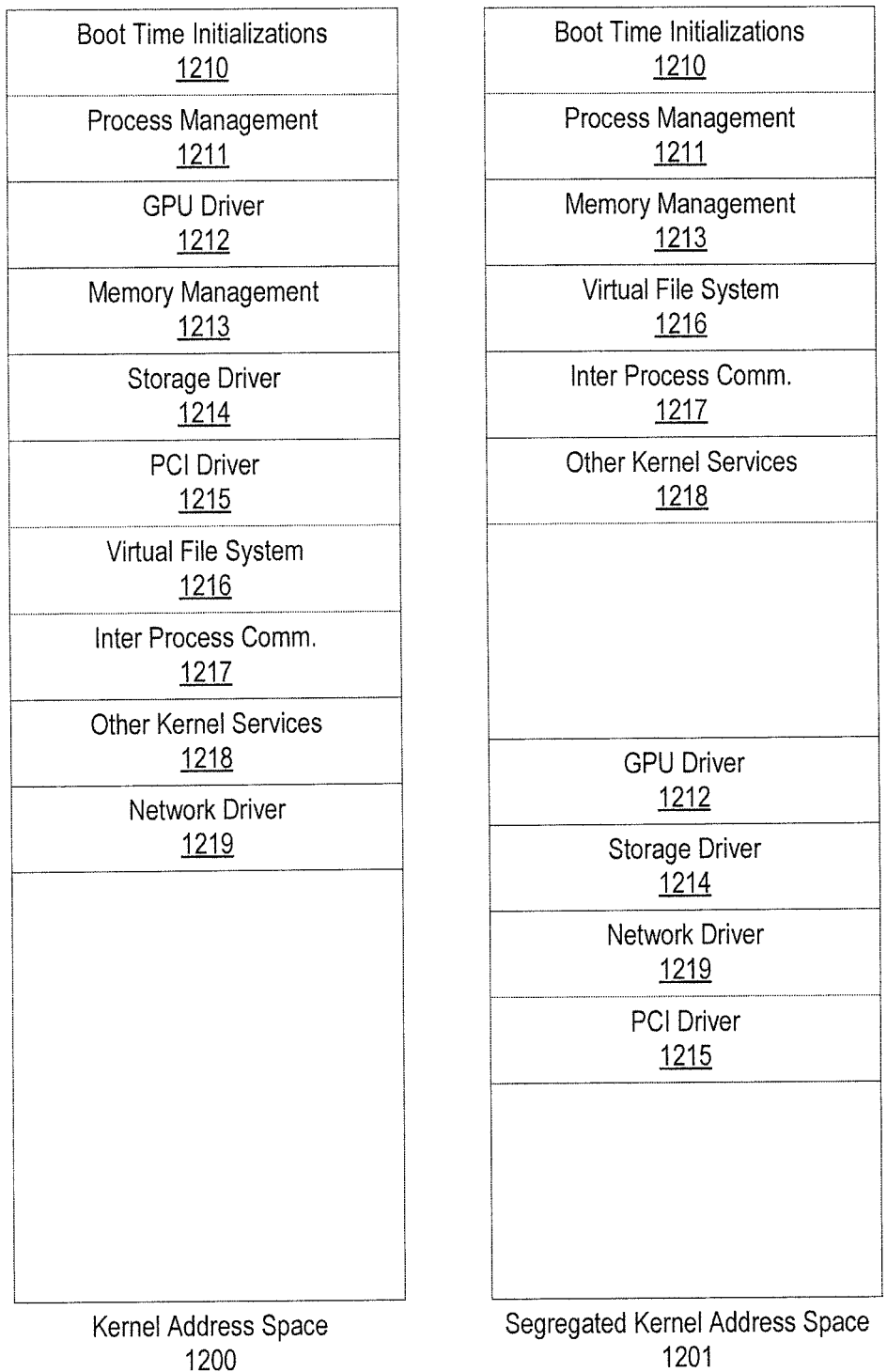
FIG. 12 illustrates an exemplary segregated kernel address space, according to one embodiment.

FIG. 12 illustrates an exemplary segregated kernel address space, according to one embodiment. The normal kernel virtual address space 1200 has compute activities (such as boot time Initializations 1210, process management 1211, memory management 1213, virtual file system 1216, inter process communication 1217, and other kernel services 1218) that are randomly intermixed with device-handling activities (such as GPU driver 1212, storage driver 1214, network driver 1219, PCI driver 1215, etc.). Thus, during HAS-SCS, context switching is required from the guest kernel to the host kernel via the TDP interface. The segregated kernel address space 1201 lays out the host and guest kernels such that the compute and device-handling chores are segregated into two distinct ranges of addresses. For the guest kernel to directly call into the DDI APIs of the native device driver, only the host device address space is required to be overlayed onto the guest address space.

Figure 13:
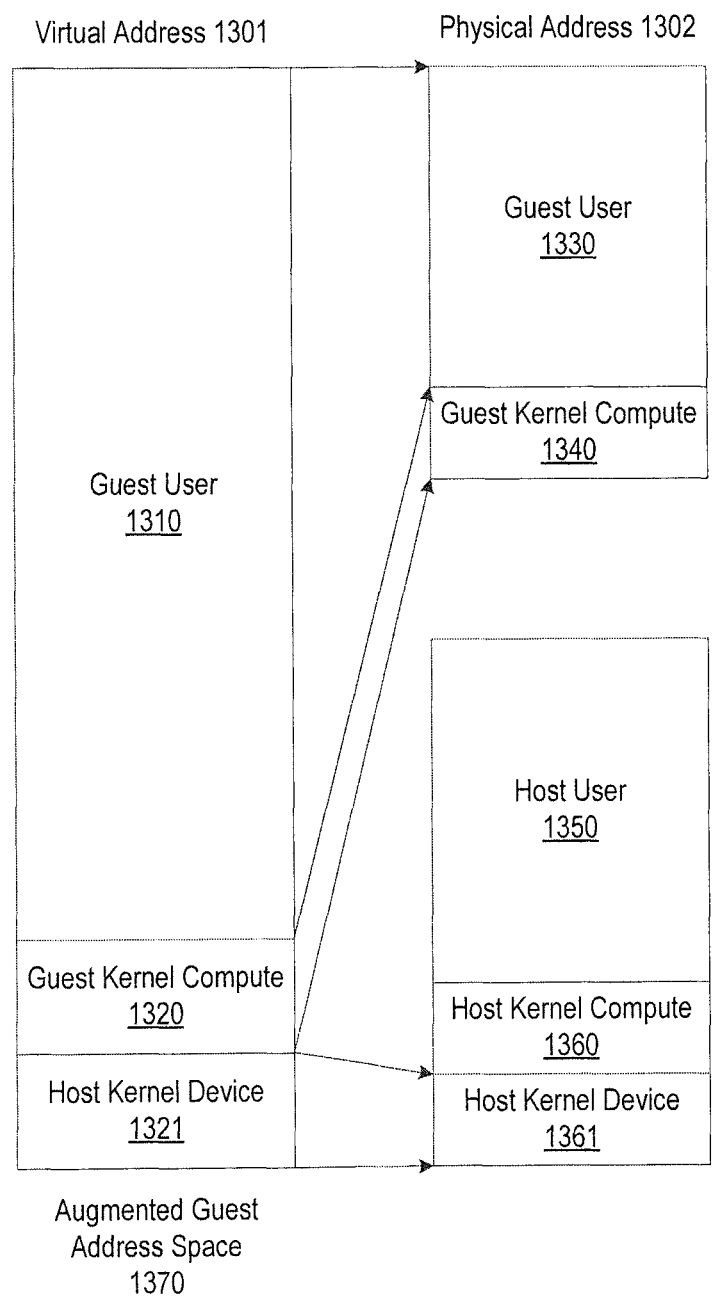
FIG. 13 illustrates an exemplary host kernel device address space augmented into a guest address space, according to one embodiment.

FIG. 13 illustrates an exemplary host kernel device address space augmented into a guest address space, according to one embodiment. The virtual address space 1301 of an augmented guest address space 1370 guest address space 1301 has guest user virtual address space 1310, and guest kernel compute virtual address space 1320, and host kernel device address space 1321. The physical address memory 1302 corresponds to the virtual address space 1301. The physical address 902 maps guest user virtual address space 1310 to physical memory 1330, guest kernel compute virtual address space 1320 to guest kernel compute physical address space 1340 and host kernel compute physical address space 1360, host user virtual address space (not shown) to physical memory 1350, and host kernel device virtual address space to host kernel device physical address space 1361. With the host kernel device address space 1361 integrated into the guest user address space 1310 and the guest kernel compute address space 1320, guest applications requests for I/O do not require to switch address spaces through the TDP.

Direct exposure of host kernel pages (e.g., host kernel device address space) into the guest user space poses security risks. For example, a rogue driver in the guest OS can corrupt parts of the host kernel device address space mapped into the guest OS and directly corrupt the same information on the host. However, from a performance perspective, this is desirable for many trusted guest OS'es, for example, those dedicated by a gaming engine to serve a particular user world, or those that are dedicated to run graphics codecs, etc. For more general purpose guest OS'es, the security can be mitigated in several ways.

The first method to enhance security of KASP-SCS: On a 32-bit guest OS on an INTEL® Architecture, the host kernel device address space mappings are laid out either at the beginning of the virtual address space (e.g., 0x00000000-0x1fffffff) or at the end of the virtual address space (e.g., 0xe0000000-0xffffffff). This arrangement of the host kernel device address space mapping sets the base and limit fields of the normal segment descriptors (e.g., CS for code, DS for data) to exclude the visibility of the guest OS into the host kernel device address space mapped into it. Only the virtual device drivers created by dynamic device virtualization knows how to use the special segment descriptors with a base and limit fields set to enable code and data in the host kernel device address space to be accessed. VMWARE® used a similar method using segment limits to map VMX code into guest address space to enable fast context switch into a hypervisor. However, the segmentation-based solution does not work elegantly on a different architecture, for example, a 64-bit architecture.

The second method to enhance security of KASP-SCS: As in the case of HAS-SCS, KASP-SCS uses two page tables, i.e., a normal guest address space without the host kernel device address space, and a hybrid address space with the host kernel device address space mapped into it. As in the case of HAS-SCS, a TDP can be used to hide the hybrid address space from user applications.

The third method to enhance security of KASP-SCS: According to one embodiment, KASP-SCS uses a distributed shared memory (DSM) architecture (e.g., page sharing DSM) to provide the security and share the code and data in the host kernel device address space with the guest OS. In the DSM architecture, code can be replicated while data has to be shared across DSM clients. Thus, a secure way of integrating the host kernel device address space into the guest OS is to have code and data pages copied and mapped to the same virtual address slots. A software memory coherency architecture ensures that code changes in the host kernel device address space are reflected coherently on DSM client guest OS'es and that data pages are coherently owned by one DSM client guest OS at a time. Different pages can be owned by different guests (or the host) depending on who modifies the page. The owner has to relinquish the ownership before another guest (or the host) can acquire ownership to modify the page. Software memory coherency architectures have some performance penalties as in the case of executing critical regions or frequently accessing same global memory locations.

As in the case of HAS-SCS, authenticated kernel module architecture is used to ensure that all direct calls from guest virtual device drivers into host native device drivers (e.g., DDI APIs) are authenticated using a cryptographic key.

KASP-SCS physically partitions the host kernel address space into compute and device address spaces. However, dynamic translation based smart context switch (DT-SCS) attains the partitioning of the host kernel address space in a logical or a virtual manner. While KASP-SCS requires a dedicated slot in the virtual address map for the kernel device address space, DT-SCS provides the flexibility to fit a dynamically translated version of the host kernel device address space (in a code cache) into any free virtual address slot of an appropriate size in the guest kernel address space.

DT-SCS is based on a code generation scheme referred to as a position independent code (PIC). The translation of normal data references by virtual address into position-independent references enables the code cache (that can share data mappings with host kernel device address space) to be freely relocatable such that it can fit into any free slot in the guest kernel address space. The code cache architecture can be flexible. There can be a single code cache shared across multiple guests, or each guest can build its own dynamically translated code cache. The former provides the elegance of the architecture and the savings on the dynamic translation time. As in the case of DSM, software memory coherency architecture ensures that code changes in the host kernel device address space cause appropriate invalidation of dynamically translated code for the corresponding pages in the code cache and that data items in the code cache are coherently owned by one guest OS at a time.

Figure 14:
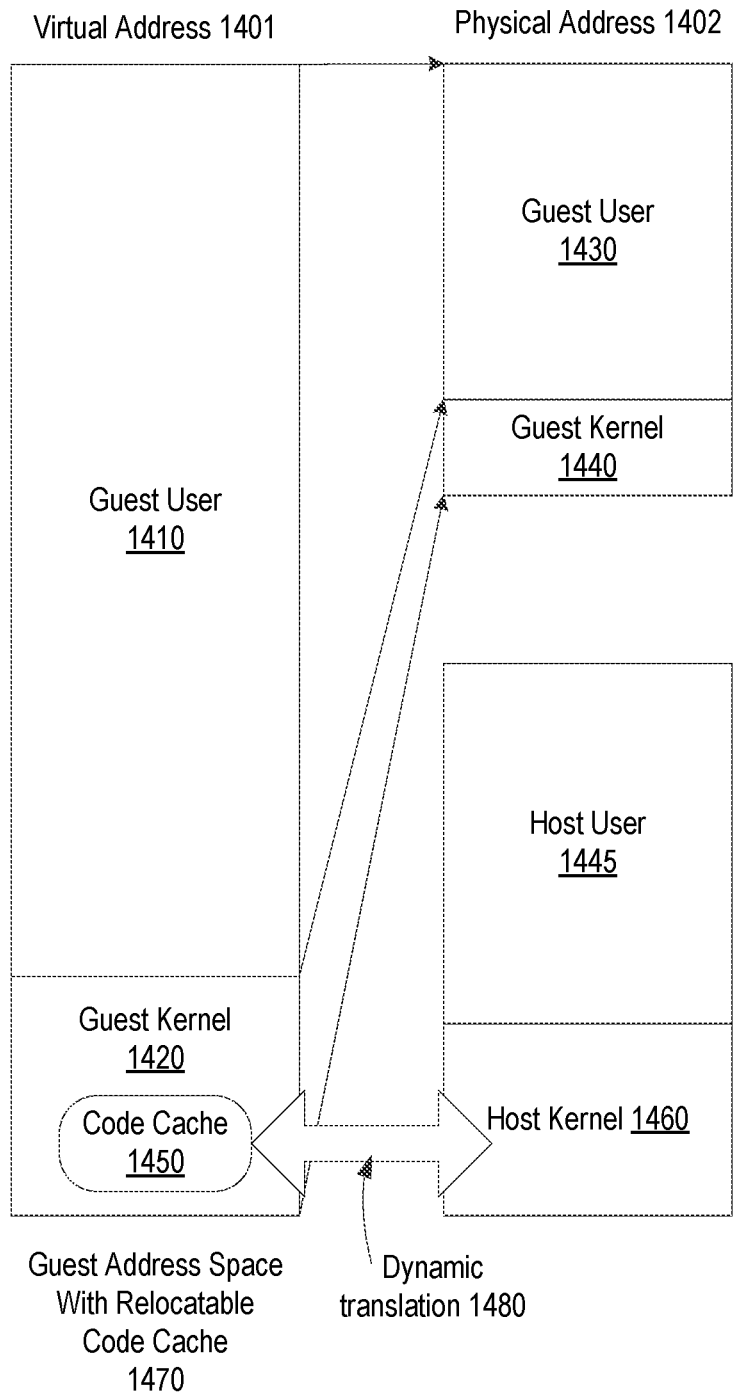
FIG. 14 illustrates an exemplary relocatable code cache integrated into a guest kernel address space, according to one embodiment.

FIG. 14 illustrates an exemplary relocatable code cache 1450 integrated into a guest kernel address space 1420, according to one embodiment. The guest virtual address space 1401 of a guest application 1470 has the guest user address space 1410 and the guest kernel address space 1420. The physical address memory 1402 maps guest user virtual address space 1410 to physical memory 1430, guest kernel virtual address space 1420 to guest kernel physical address space 1440, and host user virtual address space (not shown) to physical memory 1445. Necessary portions of the host kernel code 1460 (from host kernel device address space) is dynamically translated via 1480 and included into the code cache 1450 that can be relocated to any free slot in the guest virtual address space 1401. The physical address memory map 1402 corresponds to the guest virtual address space 1401. The code cache 1450 contains the dynamically translated version of the VFS handlers of the native device drivers. Smart context switch makes direct calls into these dynamically translated entry points corresponding to the VFS handlers for the native device drivers in the code cache. As in the case of KASP-SCS, DT-SCS also suffers from the security implications that the code cache 1450 is visible to the guest OS. The considerations to enhance security that are discussed in the case of KASP-SCS apply to the case of DT-SCS, for example, using segment limits to hide the code cache from guest OS, using a hybrid address space to selectively expose the code cache only to the virtual device drivers cloned by dynamic device virtualization, and using DSM software coherency to manage ownership of pages that are modified by the guest applications (or the host). DT-SCS also requires the authenticated kernel module architecture to ensure that only authenticated callers can access the relocatable code cache.

The United States Patent Application No. 2008/0244538 (hereinafter referred to as the '538 Application) describes multi-core processor virtualization based on dynamic binary translation with a relocatable code cache that contains only code. Unlike the relocatable code cache of the '538 Application, DT-SCS applies extensions for position-independent data references to build relocatable code cache that has both code and data. The host kernel also executes the device driver code from the dynamically translated code cache. This ensures data consistency across virtualized accesses from guest applications and native accesses from host applications.

According to one embodiment, the present system and method provides user space device interface virtualization. Device drivers reflect the correct device-specific semantics needed for user space applications to identify and configure the devices, and to operate on the devices. In the case of dynamic device virtualization, the host native device driver possesses this information, however this information needs to be passed over to guest OS'es so that guest applications can use these devices as effectively as host applications.

The device manager on the host monitors operations performed by the host native device drivers to reflect information in the host user space device interfaces (e.g., /dev, /sys, and /proc file systems for a Linux host). The virtual device drivers are instructed to mimic the same operation on the guest OS possibly with some virtualization applied. Some information such as the domain's MAC/IP addresses cannot be recorded as such, thus they are virtualized upon creation.

However, the user space device interfaces are not static, and information has to be instantaneously queried from the device driver whether it is a virtual or native device driver. This is effected by virtualizing the nodes in the user space device interfaces. For example, for each node in the Linux /sys file system that is created, a "sysfs_ops" node is registered in the kernel which identifies who (which driver) is responsible for the information. The "show" and "set" methods can be virtualized by the virtual device drivers in such a way that the appropriate values of the /sys file system node is fetched from or updated in either the host native device driver or some virtual location (e.g., MAC/IP addresses) in the guest OS.

Extrinsic dynamic device virtualization is not architecturally different in the case of dynamic device virtualization as it was in the case of devirtualization. A native device driver on the host has the intelligence to network with a peer native device driver on a different host and remotely executing all operations to the remote host native device. Thus, to the guest OS and to device driver virtualization, there is no distinction between a host native device or a remote device on a different host.

Device protocols such as USB and eSATA are gaining popularity, making it important for any software device virtualization technique to be able to effectively virtualize attached devices based on these protocols. User-installed devices and their drivers may be dealt with in different ways depending on the type and/or protocol of the device drivers. The native device drivers may be installed in the host, and dynamic device virtualization could transparently share them across multiple guest OS'es. Or for security reasons, these devices may be exclusively assigned to the guest OS that requests these devices to be installed because user-installed drivers are potentially unsafe and pose risk of bringing down the host.

A user-mode device driver enables a single application to operate on a device attached to the host. However, many user mode device drivers are architected as a service layer that provides an exclusive ownership of the device to a single application. For example, a webcam is exclusively dedicated to a video conferencing program. According to one embodiment, dynamic device virtualization provides kernel-level DDI hooks to expose user mode service layers in the host OS to guest OS'es so that applications running in the guest OS'es can operate on these devices. The user-mode device driver still requires the exclusive ownership of the device, thus only one program can operate on the device at a time.

Due to the independent rate at which the compute and I/O virtualizations are maturing, it is anticipated that system virtualization platforms or hypervisors are logically and physically bound to split into two parts: (1) compute hypervisors that ensure the efficient virtualization of CPU and memory and (2) device hypervisors that ensure improved concurrency, scalability, utilization of the devices as well as improved performance by exploiting all hardware accelerations offered by the devices. Dynamic device virtualization serves as a backbone of such a device hypervisor that can be integrated into the system platform. Platformization provides platform builders (e.g., manufacturers of processor, or computer systems) to have a better control over the virtualization performance on their platforms. In this respect, platformization is different from the efforts by virtualization software vendors such as VMWARE®, CITRIX®, and MICROSOFT® which aim at furthering performance enhancement across all platforms, not focusing on a particular platform.

By analyzing the various solutions for device driver virtualization, and smart context switch, both the compute and device hypervisors have distinct responsibilities, but they have to work in close co-ordination. For example, address space virtualization needs of dynamic device virtualization overlaps with normal memory virtualization provided by the compute hypervisor.

Figure 15:
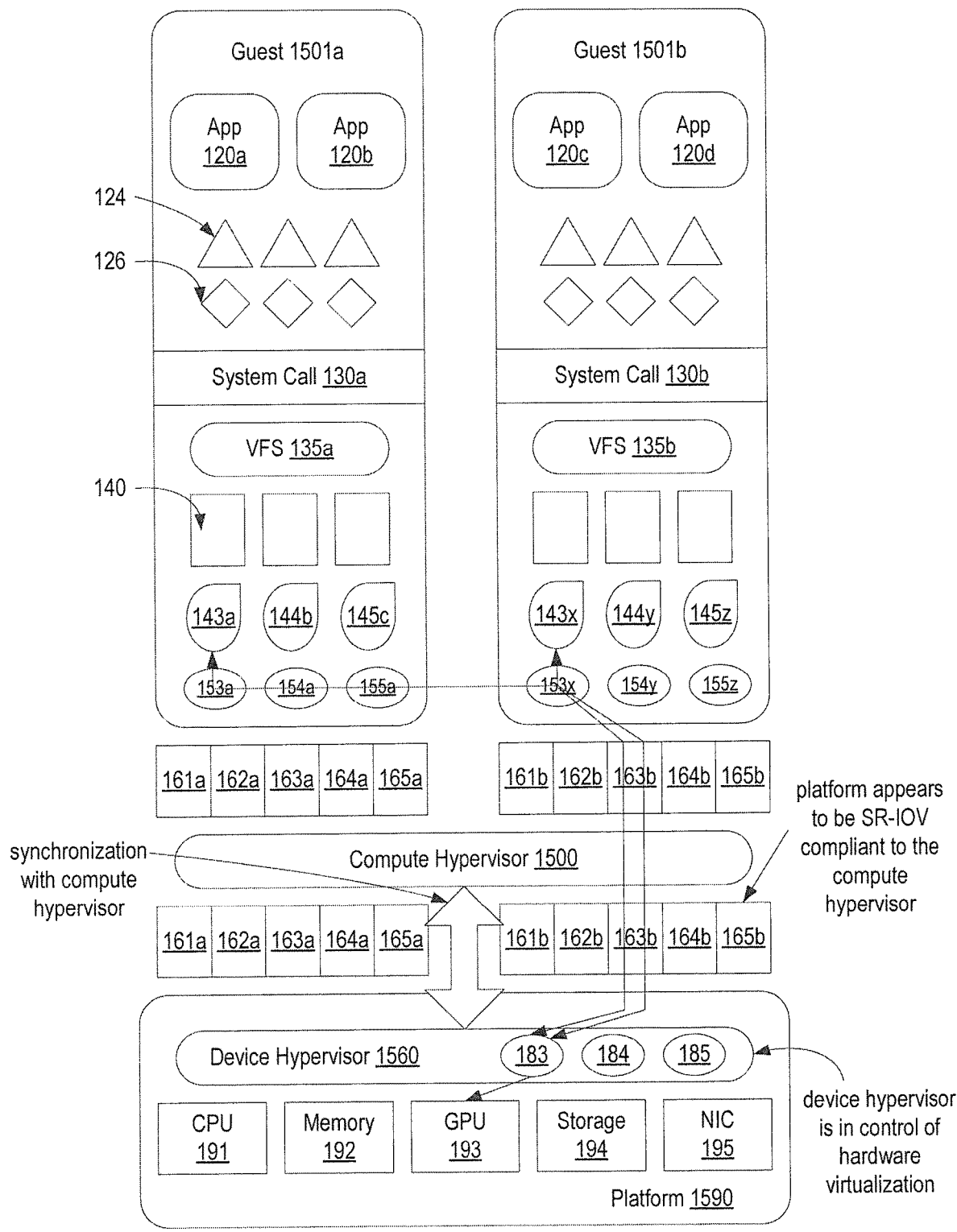
FIG. 15 illustrates a schematic diagram of an exemplary platformization of dynamic device virtualization, according to one embodiment.

FIG. 15 illustrates a schematic diagram of an exemplary platformization of dynamic device virtualization, according to one embodiment. The device hypervisor 1560 embedded into the platform 1590 is the first software component to boot on the system. The device hypervisor 1560 takes control over the system by (a) initializing hardware virtualization (e.g., VMXROOT of INTEL® VT), (b) loading the native device drivers and initializing the device tree, and (c) creating the virtual view of the devices to be cascaded to the software upstream. For example, the device hypervisor may declare that it possesses different hardware endpoints (i.e., devices) than it really has. In the example of FIG. 15, the device hypervisor reports that it has 2 GPUs, 2 storage controllers, and 2 NICs on a virtual PCI bus although any number of GPUs, storage controllers and NICs can be used. The device hypervisor makes all host native devices to appear as being SR-IOV compliant by virtue of the virtual PCI configuration that it cascades into the compute hypervisor.

Once the device hypervisor has initialized, the user can pick and choose the configuration of the software stack to run on this platform. Since the device hypervisor is also a full hypervisor, the user can directly run multiple guest OS'es right on the platform, i.e., on the bare metal. Dynamic device virtualization performs the necessary device driver virtualization chores, notifies guests of the virtual device configurations, clones and pushes virtual device drivers to the guest operating systems.

Alternatively, the user may run a commercial hypervisor (i.e., compute hypervisor 1500) of his/her choice, for example, VMWARE® ESX, CITRIX® XenServer, or MICROSOFT® Hyper-V. The device hypervisor runs the commercial hypervisor as a guest and passes control of some or all resources that the device hypervisor 1560 has to the compute hypervisor 1500. Such resources that are passed to the commercial hypervisor could include the virtual device configuration of CPU, memory, devices, or any other resources 161-165 that the device hypervisor created.

When the compute hypervisor 1500 attempts to take control of hardware virtualization, the device hypervisor 1560 intercepts it (e.g., VMExit due to VMXON) and remembers all the relevant configuration (e.g., VMExit handler) for the compute hypervisor. Though the device hypervisor 1560 controls the hardware virtualization (e.g., INTEL® VT), the device hypervisor 1560 has sufficient information to simulate VMExits into the compute hypervisor 1500 to get necessary tasks done.

When the compute hypervisor creates guests, the compute hypervisor passes the appropriate virtual device configurations to the guests, and the guests are configured to use the devices via direct device assignment. When the guest OS'es of the compute hypervisor encounters a VMExit, the VMExit handler of the device hypervisor takes control, and passes on control to the VMExit handler of the compute hypervisor as appropriate. In rare cases, the device hypervisor is involved. For example, when a new guest is launched, or its page tables or EPT gets changed, the device hypervisor creates the appropriate hybrid address space or trap door page code, and update the VMCS with the appropriate information. In subsequent VMExits, the device hypervisor ensures that the compute hypervisor sees the VMCS in the same manner as it originally created (i.e., the device hypervisor hides from the compute hypervisor all changes it made to VMCS and other system states to get dynamic device virtualization working).

The compute hypervisor is not executed as a nested VMM, but is virtualized by the device hypervisor. The present system and method provides a partitioning between the compute and device virtualization responsibilities. The compute hypervisor controls the creation and management of guest OS'es by managing CPU and memory resources. The device hypervisor defines the platform and device configurations and maintains device states seen by the compute hypervisor, thereby the compute hypervisor sees the device hypervisor as a part of the platform.

The platformization of dynamic device virtualization may be deployed in various ways. According to one embodiment, dynamic device virtualization is integrated into the processor mother board. In this case, processor manufacturers (e.g., INTEL®, AMD®, QUALCOMM®, NVIDIA®, TEXAS INSTRUMENTS®) may integrate a device hypervisor into their mother boards. In another embodiment, dynamic device virtualization is integrated into the system firmware. Systems includes servers, clients, mobiles, embedded systems, etc. In this case, system manufacturers (e.g., HP®, DELL®, SAMSUNG®) may build a device hypervisor into the firmware layer. In both cases, the device hypervisor 1560 enables motherboard and systems manufacturers to have control over virtualization performance on their own platforms, independently of software virtualization vendors such as VMWARE®, CITRIX®, and MICROSOFT®.

Additionally, processor manufacturers may provide instruction set architecture (ISA) extensions to achieve platformization. INTEL® may provide solutions to support native hybrid address space on their platforms. For example, INTEL®'s hybrid address space provides transparent access to the host kernel address space (device hypervisor) from any guest address space of any guest process or task. This solution relies on the fact that all page table structures have the user/supervisor (U/S) bit to mark user/kernel mappings. U/S bit 0 indicates that the user-mode access to the page results in a page fault. The present system and method provides instructions for SETDHBASE, ENTERHAS, and EXITHAS. SETDHBASE is used to set the base address of the device hypervisor page table. ENTERHAS is used to switch to the hybrid address space mode. EXITHAS is used to switch to the normal address space mode.

When the host (i.e., device hypervisor) is initialized, the host calls SETDHBASE to allow the system to store the base address of its page table. When ENTERHAS instruction is executed, address translation switches semantics; all user-mode pages are translated with guest user address space mapping, but all superuser-pages are translated with the page mappings of the host kernel address space. To revert to the normal address translation mode, EXITHAS instruction is executed.

INTEL®'s virtualization on the x86 platform (VT-x) features an extended page table (EPT) and provides hardware support for translating guest physical address (GPA) to host physical address (HPA). An EPT-enabled guest does not require any software intervention to translate guest virtual address (GVA) to host physical address (HPA). The normal per-process page tables that are maintained by the guest OS is responsible for the GVA to GPA translation. The guest-specific EPT that is maintained by the virtualization host (hypervisor) is responsible for the GPA to HPA translation.

Figure 16:
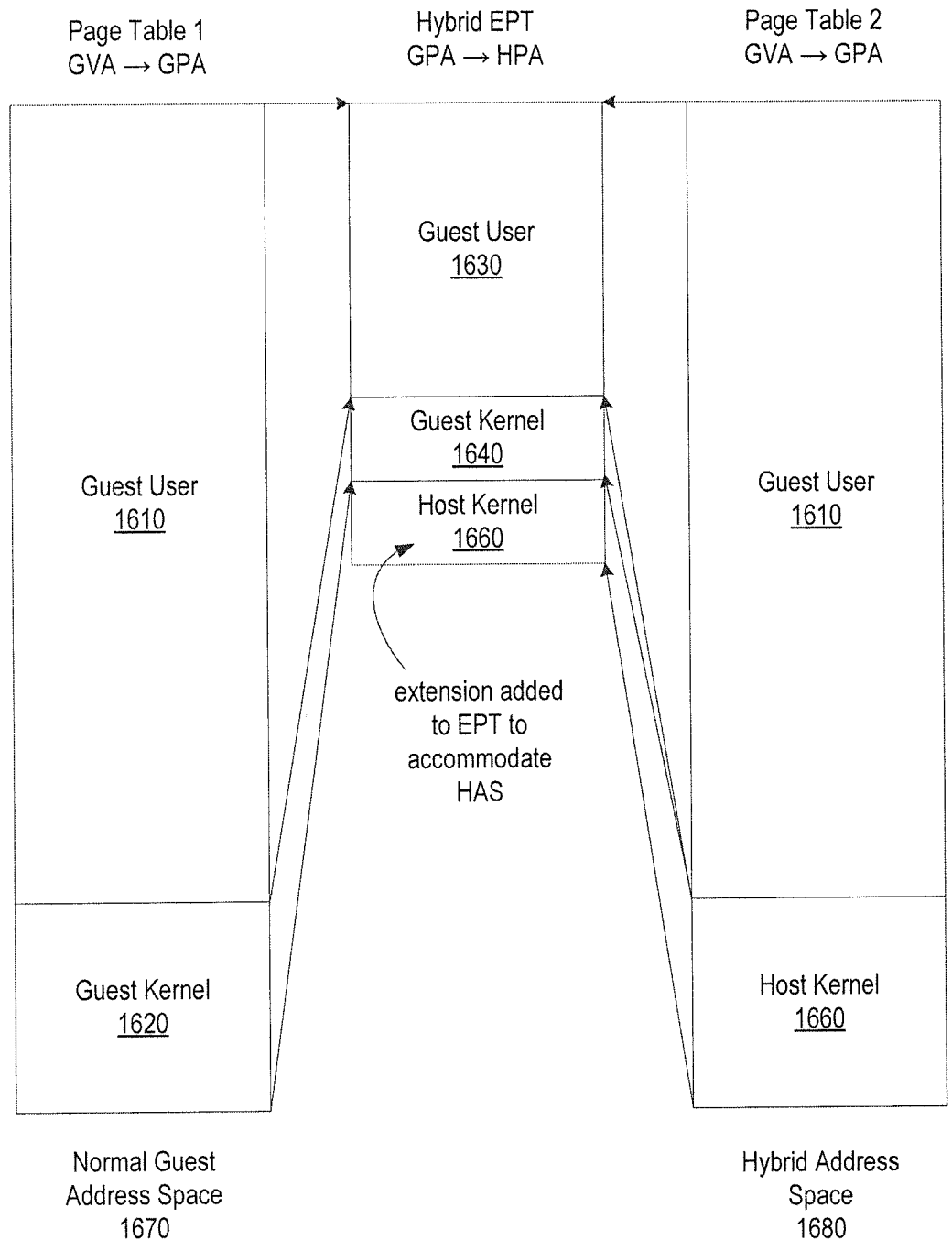
FIG. 16 illustrates an exemplary hybrid EPT-based EPT virtualization, according to one embodiment.

HAS required by HAS-SCS can be effectively implemented using EPT virtualization by designing EPT to work in non-conventional ways. In one embodiment, the present system and method provides a hybrid EPT. The hybrid EPT is built on a single EPT that supports GPA to HPA translations for guest kernel, guest user, and host kernel GPAs. FIG. 16 illustrates an exemplary hybrid EPT-based EPT virtualization, according to one embodiment. The HAS 1680 is a separate page table for a guest process built by the host with host kernel and guest user address mappings and is built and maintained in sync with the normal page table 1670 that is built and maintained for the process by the guest OS. The hybrid EPT maintained for each guest maintains all GPA to HPA translations that are needed during HAS-SCS (guest user GPA 1630, guest kernel GPA 1640, and host kernel GPA 1660). Phantom page numbers (i.e., physical memory page numbers that don't exist for the guest) are used in the hybrid address space page table 1680 to map host kernel virtual address spaces. The value of CR3 (i.e., the page directory base register (PDBR)) is switched with the base address of HAS and normal page table before and after a direct call for HAS-SCS. Normally, changing the value of CR3 results in a VMExit. A VMExit can be conceived as a trap from the guest into the host. Some operations such as the assignment to CR3 are virtualization-sensitive, and hence the guest is forced to VMExit, and the host is entered to perform special corrective actions associated with the operation that caused the exit. VMExits come with a performance penalty. However, VT-x has a provision of switching between one of up to four CR3 target values without incurring a VMExit. In the virtual machine control structure (VMCS) (used by INTEL® VT to share the host/guest state back and forth between VMExits and VMResumes), the following values are set to avoid the VMExit when a CR3 is modified:

VMCS[CR3_TARGET_VALUE0]=Base of normal address space
VMCS[CR3_TARGET_VALUE1]=Base of hybrid address space
VMCS[CR3_TARGET_COUNT]=2

In another embodiment, the present system and method provides EPTP switching. EPTP is the base of the EPT and is located inside the VMCS for the guest VM. INTEL® VT-x function VMFUNC with EAX=0 and an index ECX=n is used to switch EPTP to the n-th value in a list of up to 512 EPTP values that the host can create for the guest VM. The guest OS (or the DDV virtual drivers in the guest OS) modifies the address space of each process to use phantom page numbers (i.e., physical memory page numbers that do not exist for the guest) to map the kernel address space. The host builds two EPTs for each guest, one the phantom page numbers (GPA) mapped into HPA for the guest kernel mappings, and the other with the phantom page numbers (GPA) mapped into the HPA for the host kernel mappings. The list of 512 EPTPs for the guest OS is made available to the guest via one of the 64-bit control fields (e.g., index=000010010B) in the VMCS.

Figure 17:
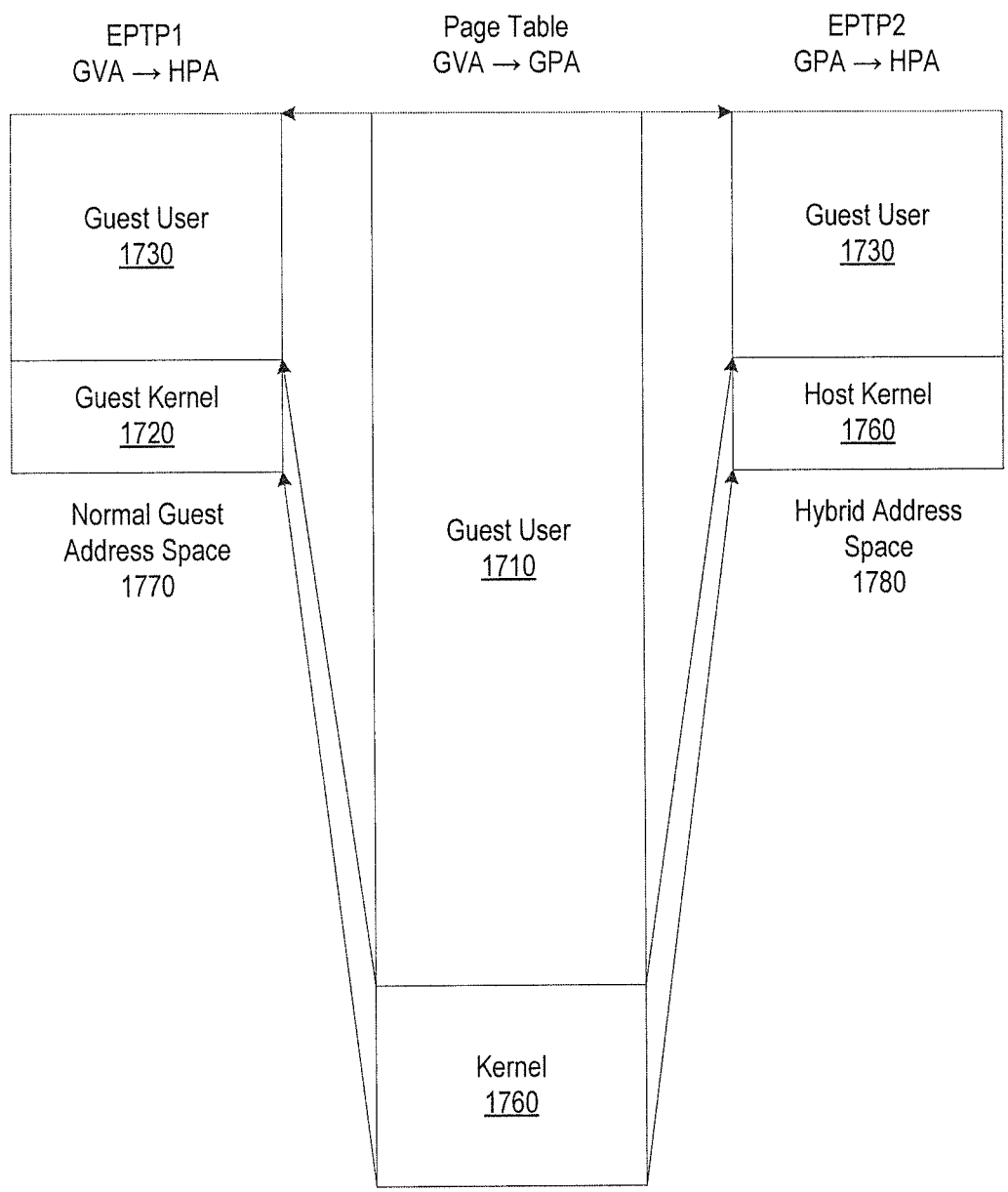
FIG. 17 illustrates an exemplary EPTP switching based EPT virtualization, according to one embodiment.

FIG. 17 illustrates an exemplary EPTP switching based EPT virtualization, according to one embodiment. EPTP1 is the EPTP that has the GPA to HPA mappings of normal guest address space 1770 that has guest user address space 1730 and guest kernel address space 1720, whereas EPTP2 is the EPTP used when hybrid address 1780 that has guest user address space 1710 and host kernel address space 1760 is in play. EPTP2 additionally has the GPA to HPA mappings for host kernel address space. The host lets each guest know the addresses of EPTP1 and EPTP2. From that point, the guest itself can use VMFUNC to switch between EPTP1 and EPTP2 while performing HAS-SCS. EPTP switching is more secure than hybrid EPT because it does not leave host kernel GPA mappings open in the guest for malicious drivers to access and mutilate the host kernel. EPTP2 is exposed only during the direct calls of HAS-SCS.

INTEL® VT-x extended page table (EPT) provides the capability to map pages as execute-only and read/write protected. This is enabled by setting the bit 0 of IA32_VMX_EPT_VPID_CAP MSR (i.e., index 48CH). The IA32_VMX_EPT_VPID_CAP MSR exists only on processors that support the 1-setting of the "activate secondary controls" VM-execution control (only if bit 63 of the IA32_VMX_PROCBASED_CTLS MSR is 1) and that support either the 1-setting of the "enable EPT" VM-execution control (only if bit 33 of the IA32_VMX_PROCBASED_CTLS2 MSR is 1) or the 1-setting of the "enable VPID" VM execution control (only if bit 37 of the IA32_VMX_PROCBASED_CTLS2 MSR is 1).

According to one embodiment, host native device drivers whose entry points (i.e., DDI APIs) are shared with guest virtual device drivers are loaded securely via a sand box that enforces authenticated calls from guest callers. An extra argument is passed together with each DDI API call that is a token encrypted with a public key stored in the trusted program module (TPM) of the system. The present system and method provides a mechanism to load native device drivers in such a way that the sand box for authenticated calls is automatically generated. The host callers (e.g., applications running directly on the host) can call directly into the original entry points.

Figure 18:
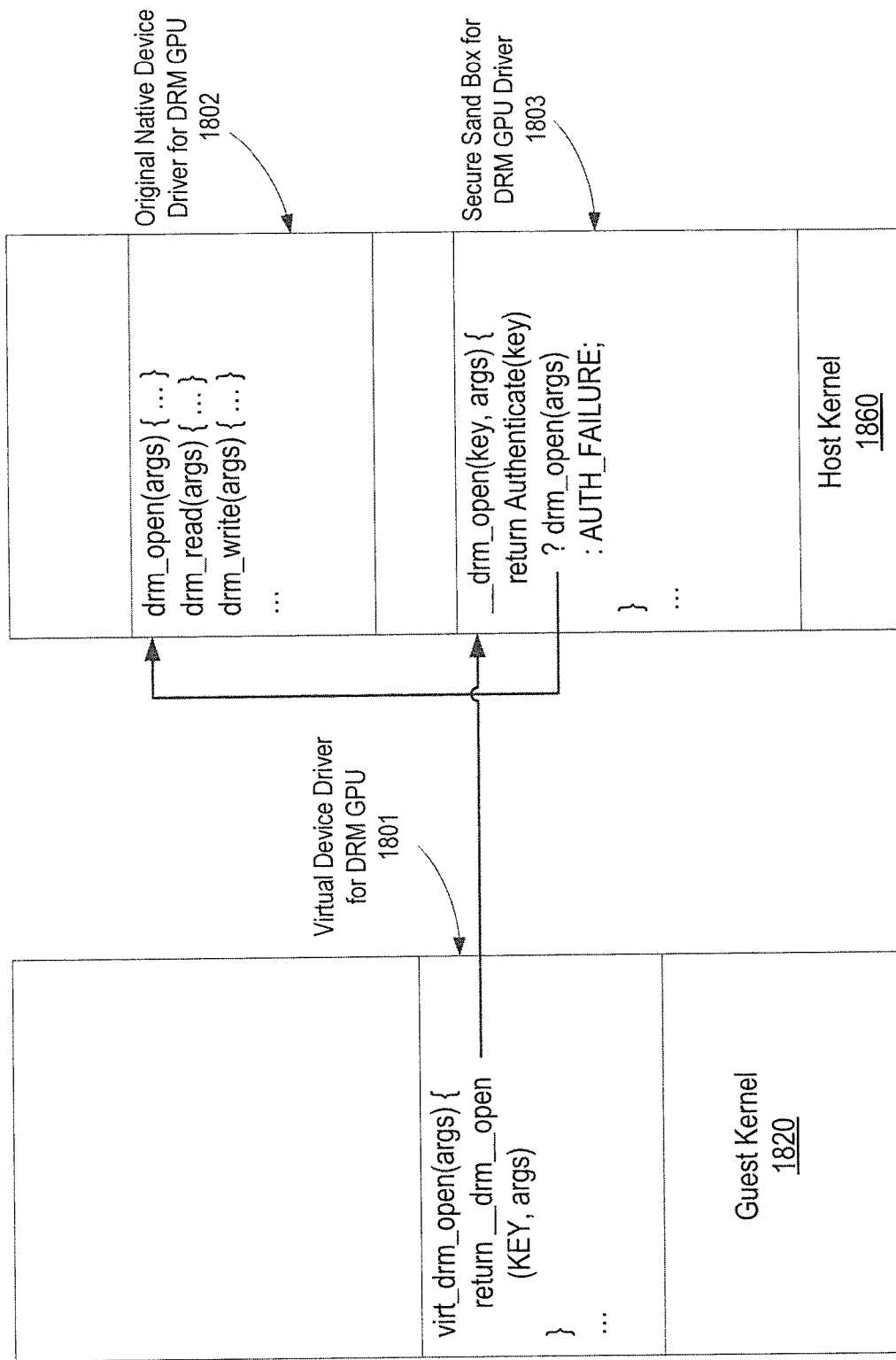
FIG. 18 illustrates an exemplary sand box for a native device driver, according to one embodiment.

FIG. 18 illustrates an exemplary sand box for a native device driver, according to one embodiment. The VFS open method for the DRM host native driver is drm_open( ). While callers on the host can directly call into this entry point, all guest callers who make direct calls, through smart context switch (SCS) call into a sandboxed entry point, _drm_open( ). The native DDIs are extended to require an authentication key to be passed as an argument to each SCS call. The _drm_open( ) function validates the key, and if found valid, calls drm_open( ). Otherwise, the SCS call fails.

As an additional security feature to hide the actual entry points into a native device driver, the key that is passed as argument to the secure entry points in the sand box (e.g., _drm_open) may be decrypted to obtain the displacement of the actual entry point from a known location (e.g., current program counter or instruction pointer). This avoids the need to hardcode the pointer to the actual entry point inside the sand-boxed code. For performance reasons, the authentication may need to be enforced only once for each guest call site. Once authenticated, the call site can be permitted to directly call into the original entry points of the host native device drivers.

The above example embodiments have been described herein above to illustrate various embodiments of implementing a system and method for providing dynamic device virtualization. Various modifications and departures from the disclosed example embodiments will occur to those having ordinary skill in the art. The subject matter that is intended to be within the scope of the present disclosure is set forth in the following claims.

I claim:

1. A computer-implemented method, comprising:
providing one or more guest virtual machines (VMs), wherein each guest VM runs a guest user process;
providing a device hypervisor embedded into one or more of a motherboard, a firmware or a CPU, wherein the device hypervisor has a device manager, and wherein the device hypervisor has native device drivers associated with devices of a host;
providing, by the device hypervisor, a compute hypervisor that creates and manages the one or more guest VMs;
providing, by the device manager on the device hypervisor, a plurality of virtual device drivers in the one or more guest VMs, wherein the plurality of virtual device drivers were cloned from the native device drivers by the device manager based on observed behaviors of the native device drivers, the observed behaviors including (a) registration of the native device drivers, (b) registration of virtual file system function tables by the native device drivers, and (c) creation of user space device interfaces;
creating a table of virtual file system (VFS) operations on the one or more guest VMs with pointers into corresponding VFS operations of the native device drivers of the device hypervisor;
intercepting with the device hypervisor using the table of VFS operations, a direct call by the one or more guest VMs on the compute hypervisor to manage a device connected to the host; and
managing, by the one or more guest VMs using a virtual device driver of the plurality of device drivers, the device of the host through the native device driver associated with the device.

2. The computer-implemented method of claim 1, wherein the compute hypervisor is selected from a group comprising XEN®, KVM, VMWARE®, Hyper-V.

3. The computer-implemented method of claim 1 further comprising virtualizing the compute hypervisor for each of the one or more guest VMs.

4. The computer-implemented method of claim 1, wherein the device hypervisor maintains states of the one or more guest VMs seen by the compute hypervisor.

5. The computer-implemented method of claim 1, wherein the device hypervisor builds and manages a hybrid address space and hides the hybrid address space from the compute hypervisor.

6. The computer-implemented method of claim 1, wherein the compute hypervisor sees the device hypervisor as a part of a system platform.

7. The computer-implemented method of claim 1, wherein the device hypervisor allows a host native device to appear to the compute hypervisor as single root I/O virtualization (SR-IOV) compliant by a virtual PCI configuration.

8. The computer-implemented method of claim 7, wherein the compute hypervisor assigns a plurality of virtual functions of the host native device to each of the one or more guest VMs without knowledge about the devices.

9. The computer-implemented method of claim 1, wherein the device hypervisor provides a software virtualization vendor by providing the compute hypervisor that is independent of a software virtualization platform.

10. The computer-implemented method of claim 9, wherein the software virtualization platform is implemented on a processor motherboard.

11. The computer-implemented method of claim 9, wherein the software virtualization platform is implemented on a system firmware.

12. The computer-implemented method of claim 9, wherein the one or more guest VMs boot on a bare metal by embedding the device hypervisor into the software virtualization platform.

13. The computer-implemented method of claim 9 further providing instruction set architecture (ISA) for the software virtualization platform, wherein the ISA allows for transparent access to a host kernel address space from a guest address space of the one or more guest VMs.

14. A non-transitory computer readable medium containing computer-readable instructions stored therein for causing a computer processor to perform operations comprising:
providing one or more guest virtual machines (VMs), wherein each guest VM runs a guest user process;
providing a device hypervisor embedded into one or more of a motherboard, a firmware or a CPU, wherein the device hypervisor has a device manager, and wherein the device hypervisor has native device drivers associated with devices of a host;
providing, by the device hypervisor, a compute hypervisor that creates and manages the one or more guest VMs;
providing, by the device manager on the device hypervisor, a plurality of virtual device drivers in the one or more guest VMs, wherein the plurality of virtual device drivers were cloned from the native device drivers by the device manager based on observed behaviors of the native device drivers , the observed behaviors including (a) registration of the native device drivers, (b) registration of virtual file system function tables by the native device drivers, and (c) creation of user space device interfaces;

creating a table of virtual file system (VFS) operations on the one or more guest VMs with pointers into corresponding VFS operations of the native device drivers of the device hypervisor;

intercepting with the device hypervisor using the table of VFS operations, a direct call by the one or more guest VMs on the compute hypervisor to manage a device connected to the host; and managing, by the one or more guest VMs using a virtual device driver of the plurality of device drivers, the device of the host through the native device driver associated with the device.

15. The non-transitory computer readable medium of claim 14, wherein the device hypervisor builds and manages a hybrid address space and hides the hybrid address space from the compute hypervisor.

16. The non-transitory computer readable medium of claim 14, wherein the device hypervisor allows a host native device to appear to the compute hypervisor as single root I/O virtualization (SR-IOV) compliant by a virtual PCI configuration.

17. The non-transitory computer readable medium of claim 14, wherein the device hypervisor provides a software virtualization vendor by providing the compute hypervisor that is independent of a software virtualization platform.

18. The non-transitory computer readable medium of claim 17, wherein the one or more guest VMs boot on a bare metal by embedding the device hypervisor into the software virtualization platform.

19. The non-transitory computer readable medium of claim 17, wherein the computer-readable instructions stored therein for causing the computer processor to perform operations further comprising providing instruction set architecture (ISA) for the software virtualization platform, wherein the ISA allows for transparent access to a host kernel address space from a guest address space of the one or more guest VMs.

* * * * *